US012785296B2

(12) United States Patent
Sugimoto

(10) Patent No.: US 12,785,296 B2
(45) Date of Patent: Nov. 3, 2026

(54) TERMINAL STRUCTURE OF ELECTRIC APPARATUS

(71) Applicant: Mazda Motor Corporation, Aki-gun (JP)

(72) Inventor: Manabu Sugimoto, Aki-gun (JP)

(73) Assignee: Mazda Motor Corporation, Aki-gun (JP)

( * ) Notice: Subject to any disclaimer, the term of this patent is extended or adjusted under 35 U.S.C. 154(b) by 335 days.

(21) Appl. No.: 18/735,442

(22) Filed: Jun. 6, 2024

(65) Prior Publication Data

US 2024/0421507 A1 Dec. 19, 2024

(30) Foreign Application Priority Data

Jun. 16, 2023 (JP) ................................ 2023-099461

(51) Int. Cl.

*H02K 5/22* (2006.01)
*B60K 1/00* (2006.01)
*B60L 15/00* (2006.01)
*H01R 4/28* (2006.01)

(52) U.S. Cl.

CPC ................. *H01R 4/28* (2013.01); *B60K 1/00* (2013.01); *B60L 15/007* (2013.01); *H02K 5/225* (2013.01); *B60L 2210/40* (2013.01); *H01R 2201/26* (2013.01)

(58) Field of Classification Search

CPC ........ H01R 4/28; H01R 2201/26; B60K 1/00; B60L 15/007; B60L 2210/40; H02K 5/225

USPC .......................................................... 439/709

See application file for complete search history.

(56) References Cited

U.S. PATENT DOCUMENTS

| | | | | |
|---|---|---|---|---|
| 2015/0151695 A1* | 6/2015 | Oh | B60L 50/00 361/826 |
| 2020/0036144 A1* | 1/2020 | Aneha | H02K 3/50 |
| 2022/0077606 A1 | 3/2022 | Broicher et al. | |
| 2022/0190675 A1* | 6/2022 | Uneme | H02K 5/225 |
| 2022/0311306 A1* | 9/2022 | Kunii | H01R 9/18 |
| 2024/0421721 A1* | 12/2024 | Sugimoto | H02M 7/003 |
| 2025/0303826 A1* | 10/2025 | Shiba | B60H 1/3228 |
| 2025/0303847 A1* | 10/2025 | Sugimoto | B60K 6/405 |
| 2026/0005451 A1* | 1/2026 | Zhang | H01R 4/305 |

FOREIGN PATENT DOCUMENTS

| | | |
|---|---|---|
| JP | 2021052499 A | 4/2021 |
| JP | 2022519384 A | 3/2022 |
| WO | 2021059677 A1 | 4/2021 |

* cited by examiner

*Primary Examiner* — Tulsidas C Patel

(74) *Attorney, Agent, or Firm* — Alleman Hall LLP

(57) ABSTRACT

A terminal structure includes mutually adjacent first and second terminals, each having a connecting part for electric connection to an external apparatus, and a case accommodating the terminals and having a tool insertion opening. The connecting parts have a flat connecting surface. When first and second virtual planes along the connecting surfaces and first and second normal lines to the connecting surfaces are drawn, the virtual planes intersect with each other at an obtuse angle, and when viewed from one side in a direction in which a line intersection between the virtual planes extends, the normal lines pass through the opening and intersect with each other at an opposite side of the disposed positions of the connecting parts with respect to a position at half of the shorter one of first and second distances from the first and second virtual planes to the opening.

18 Claims, 15 Drawing Sheets

TERMINAL STRUCTURE OF ELECTRIC APPARATUS

TECHNICAL FIELD

The present disclosure relates to a terminal structure of an electric apparatus.

BACKGROUND OF THE DISCLOSURE

In recent years, vehicles provided with a motor as a drive source for propelling the vehicles have increased. Such vehicles carry a high-voltage battery for supplying electric power to the motor. In addition, the vehicles also carry a power converter for converting direct current (DC) power supplied from the battery into alternating current (AC) power.

The power converter, the motor, and the battery form an electric power supply passage therebetween by connecting wiring extending from the motor and the battery to terminals of the power converter. JP2022-519384A and JP2021-052499A disclose connecting structures of the power converter and the motor.

JP2022-519384A discloses a configuration in which the power converter is placed on a motor housing, and the wiring of the power converter is connected to the wiring of the motor via a connector assembly. This connector assembly has three terminals disposed along a circumferential surface of the motor housing.

On the other hand, JP2021-052499A discloses a configuration in which the power converter is also accommodated in a housing which accommodates a stator and a rotor of the motor. This housing has a large opening on the side where the power converter is accommodated. This large opening is used for a tool insertion when accommodating the power converter in the housing, and connecting the wiring of the power converter to the terminals of the motor. This large opening is closed by a cover.

Meanwhile, although JP2022-519384A does not explicitly illustrate the wiring extending from the power converter and the motor, and a case and a lid which cover the connector assembly, they are typically covered by the case in order to avoid a situation in which an external object contacts the wiring, etc. In this case, as illustrated in FIG. 15, since terminals 902-904 of the connector assembly are disposed along an outer circumferential surface of a motor housing 900, a large opening 905*a* and a large lid 906 need to be provided to a case 905 covering the terminals 902-904. That is, when connecting the wiring of the motor to the terminals 902-904, it is possible to fasten therebetween with bolts BLT using a tool 910. In this case, since the terminals 902-904 are disposed along the circumferential surface of the motor housing 900, when drawing virtual planes L902, L903, and L904 along connecting parts 902*a*, 903*a*, and 904*a*, angles θ91 and θ92 formed between adjacent virtual planes L902, L903, and L904 become larger than 180°. For this reason, center lines Ax902, Ax903, and Ax904 which intersect perpendicularly to the virtual planes L902, L903, and L904 and pass through the centers of fastening holes 902*b*, 903*b*, and 904*b* spread radially toward the opening 905*a* from the inside of the case 905. That is why the large opening 905*a* is necessary when connecting the wiring of the motor to the terminals 902-904.

Since the large opening 905*a* is necessary for inserting the tool as described above, the case 905 and the lid 906 are also necessary to be large in the size. This obstructs a potential demand of making occupancy spaces of various electric apparatuses including the power converter smaller.

Note that although in the above explanation the power converter is one example of the electric apparatus in the vehicle, similar problems may happen in other electric apparatuses.

SUMMARY OF THE DISCLOSURE

The present disclosure is made in view of solving the above problem, and one purpose thereof is to provide a terminal structure of an electric apparatus, provided with a plurality of terminals for electric connection with an external apparatus inside a downsized case.

A terminal structure of an electric apparatus according to one aspect of the present disclosure includes a plurality of terminals at least including a first terminal and a second terminal adjacent to the first terminal, each of the terminals having a connecting part that is electrically connected to an external apparatus and is arranged to extend from a predetermined reference plane to a direction orthogonal to the reference plane. The terminal structure further includes a case accommodating the plurality of terminals, and having a tool insertion opening into which a tool for electric connection of the plurality of terminals is to be inserted in a part of an outer wall.

In the terminal structure of the electric apparatus according to this aspect, the connecting part of each of the plurality of terminals has a flat connecting surface and a through-hole into which a bolt for the electrical connection is inserted. Assume there are the following first and second normal lines. The first normal line is a virtual line that passes through a radial center of the through-hole in the connecting part of the first terminal and extends in a direction normal to the connecting surface in the connecting part of the first terminal. The second normal line is a virtual line that passes through a radial center of the through-hole in the connecting part of the second terminal and extends in a direction normal to the connecting surface in the connecting part of the second terminal.

In the above case, when viewed from the direction orthogonal to the reference plane, the connecting part of the first terminal and the connecting part of the second terminal are arranged such that a distance between a point where the first normal line passes through the tool insertion opening and a point where the second normal line passes through the tool insertion opening is shorter than a distance between an intersection of the connecting surface and the first normal line in the connecting part of the first terminal and an intersection of the connecting surface and the second normal line in the connecting part of the second terminal.

In the terminal structure of the electric apparatus according to this aspect, the connecting part of the first terminal and the connecting part of the second terminal are arranged such that the distance between the points where the first and second normal lines respectively pass through the tool insertion opening is shorter than the distance between the intersection of the respective connecting surfaces of the first and second terminals and the corresponding respective normal lines (the first normal line and the second normal line). As a result, in the terminal structure of the electric apparatus according to this aspect, the size of the tool insertion opening in the case can be downsized compared to the situation where radial diffusion occurs outward, as shown in FIG. 15. This reduction allows the size of the case to be reduced.

In the terminal structure of the electric apparatus according to this aspect, assume the are the following first and second virtual planes. The first virtual plane is a virtual plane along the connecting surface of the connecting part of the first terminal. The second virtual plane is a virtual plane along the connecting surface of the connecting part of the second terminal. In this case, the shortest distance from the intersection of the first virtual plane and the first normal line to a part of the outer wall is defined as the first distance, and the shortest distance from the intersection of the second virtual plane and the second normal line to the part of the outer wall is defined as the second distance.

In the above case, the reference plane may be defined in a direction orthogonal to an intersection of the first virtual plane and the second virtual plane where the first virtual plane and the second virtual plane intersect. Further, the connecting part of the first terminal and the connecting part of the second terminal may be disposed so that the first virtual plane and the second virtual plane intersect with each other at an obtuse angle, and when viewed from the direction orthogonal to the reference plane, the first normal line and the second normal line pass through the tool insertion opening, and the first normal line and the second normal line intersect with each other at an opposite side of the disposed positions of the connecting parts of the first terminal and the second terminal with respect to a position that is half of a distance of the shorter one of the first distance and the second distance.

In the terminal structure of the electric apparatus according to this aspect, the connecting part of the first terminal (first connecting part) and the connecting part of the second terminal (second connecting part) are disposed so that the virtual planes (the first virtual plane, the second virtual plane) along the respective connecting surfaces intersect with each other at the obtuse angle. Therefore, as compared with a case where the connecting parts of all the terminals are disposed so that the virtual planes are parallel to each other, a space which the connecting parts of the plurality of terminals occupy can be reduced by an amount of inclination of at least one of the first and second connecting parts. Therefore, the terminal structure of the electric apparatus according to this aspect is even more effective in reducing the size of the case which accommodates the plurality of terminals.

Further, in the terminal structure of the electric apparatus according to this aspect, when viewed from a direction orthogonal to the reference plane, the first connecting part and the second connecting part are disposed so that the normal lines intersect with each other at the opposite side of the disposed positions of the connecting parts of the first terminal and the second terminal with respect to the half position described above. Therefore, as compared with a case where normal lines of all the connecting parts of the plurality of terminals are parallel to each other, and a case where the normal lines spread radially outwardly as illustrated in FIG. 15, the size of the tool insertion opening of the case can be reduced, and the size of the case can also be downsized.

In the terminal structure of the electric apparatus according to this aspect, the connecting part of the first terminal and the connecting part of the second terminal may be disposed so that the first normal line and the second normal line intersect with each other outside the case, when viewed from the direction orthogonal to the reference plane.

In the terminal structure of the electric apparatus according to this aspect, since the intersection between the first normal line and the second line is located outside the case (outward of the tool insertion opening), when viewed from the direction orthogonal to the reference plane, the size of the tool insertion opening of the case can be reduced while reducing the distance between the first and second terminals and the tool insertion opening, as compared with a case where the intersection is located inside the case.

In the terminal structure of the electric apparatus according to this aspect, the plurality of terminals may be disposed so that gaps between adjacent connecting parts are more than an insulation distance.

In the terminal structure of the electric apparatus according to this aspect, since the gaps between the adjacent connecting parts are set to more than the insulation distance, it is not necessary to insert insulators, such as ribs, into the gaps between the connecting parts. For this reason, even if the first virtual plane and the second virtual plane intersect with each other at the obtuse angle in a dented manner, the tool can be inserted easily to the connecting parts, and a rise in the manufacturing cost can be suppressed.

In the terminal structure of the electric apparatus according to this aspect, in a direction orthogonal to the direction in which the first distance and the second distance above are defined in the reference plane, the tool insertion opening may be formed so that an opening length of the tool insertion opening is shorter than a layout length of the connecting parts of the plurality of terminals.

In the terminal structure of the electric apparatus according to this aspect, since the opening length of the tool insertion opening of the case is set shorter than the layout length of the connecting parts of the plurality of terminals in the same direction (direction orthogonal to the direction in which the first and second distances above are defined), the tool insertion opening for inserting the tool in a narrow area can be provided. Therefore, it is advantageous to reduce the external size of the electric apparatus.

In the terminal structure of the electric apparatus according to this aspect, the electric apparatus may be a power converter configured to convert DC power into AC power. The external apparatus may be a three-phase AC motor configured to rotate in response to supply of three-phase AC power. The plurality of terminals may be disposed in an electric power supply passage to the three-phase AC motor, and may be comprised of the first terminal, the second terminal, and a third terminal of which a connecting part is disposed adjacent to the connecting part of the second terminal. Further, assume there are the following third virtual plane and third normal line. The third virtual plane is a virtual plane along a connecting surface of the connecting part of the third terminal. The third normal line is a virtual line that passes through a radial center of the through-hole in the connecting part of the third terminal and extends in a direction normal to the connecting surface in the connecting part of the third terminal. In this case, the shortest distance from a point where the third virtual plane and the third normal line intersect to the part of the outer wall is a third distance.

In the above case, the connecting part of the third terminal may be disposed so that the second virtual plane and the third virtual plane intersect with each other at an obtuse angle, and when viewed from the direction orthogonal to the reference plane, the second normal line and the third normal line pass through the tool insertion opening. Further, the connecting part of the third terminal may be disposed so that the second normal line and the third normal line intersect with each other at an opposite side of the disposed positions of the connecting parts of the second terminal and the third terminal with respect to a position that is half of a distance of the shorter one of the second distance and the third distance.

In the terminal structure of the electric apparatus according to this aspect, the power converter is applied as one example of the electric apparatus, and the three-phase AC motor is applied as one example of the external apparatus. The connecting part of the third terminal is also disposed with respect to the second connecting part as described above. Therefore, also in the case where the three connecting parts are accommodated in the case, the external size of the case can be reduced.

In the terminal structure of the electric apparatus according to this aspect, the connecting part of the second terminal and the connecting part of the third terminal may be disposed so that the second normal line and the third normal line intersect with each other outside the case, when viewed from the direction orthogonal to the reference plane.

In the terminal structure of the electric apparatus according to this aspect, since the intersection between the second normal line and the third line is located outside the case (outward of the tool insertion opening), when viewed from the direction orthogonal to the reference plane, the size of the tool insertion opening can be reduced while reducing the distance between the third terminal and the tool insertion opening, as compared with a case where the intersection is located inside the case.

In the terminal structure of the electric apparatus according to this aspect, when viewed from the direction orthogonal to the reference plane, a direction connecting a point where the first normal line passes through the tool insertion opening and a point where the second normal line passes through the tool insertion opening is defined as a first direction, and a direction orthogonal to the first direction on the reference plane is defined as a second direction. Further, assume there are the following first and second imaginary lines. The first imaginary line is an imaginary line that passes through a radial center of the through-hole in the connecting part of the first terminal and extends in the second direction. The second imaginary line is an imaginary line that passes through a radial center of the through-hole in the connecting part of the second terminal and extends in the second direction.

In the above case, the point where the first normal line passes through the tool insertion opening and the point where the second normal line passes through the tool insertion opening may be positioned in an area between the first imaginary line and the second imaginary line in the first direction.

In the terminal structure of the electric apparatus according to this aspect, each connecting part of the first terminal and the second terminal is arranged so that the points where the first normal line and the second normal line each pass through the tool insertion opening are located in the area between the first and second imaginary lines in the first direction. Therefore, as compared with a case where normal lines of all the connecting parts of the plurality of terminals are parallel to each other, and a case where the normal lines spread radially outwardly as illustrated in FIG. 15, the size of the tool insertion opening of the case can be reduced, and the size of the case can also be downsized.

In the terminal structure of the electric apparatus according to this aspect, the motor may be a motor for propelling a vehicle, the motor mounted in a powertrain room of the vehicle and having a motor housing serving as an outer cell. A transmission having an axle housing serving as an outer cell may be mounted adjacent to the motor in the powertrain room. The case may be disposed on at least one of the motor housing and the axle housing so that the tool insertion opening is oriented to an input side of an impact load expected in the vehicle. An end of the case on the input side may be flush in the surface with the motor housing or the axle housing, or may be located on an opposite side from the input side.

In the terminal structure of the electric apparatus according to this aspect, the power converter as the electric apparatus is carried in the powertrain room of the vehicle, and the power converter is disposed so that the tool insertion opening is oriented to the input direction of the expected load to the vehicle. Further, the case of the power converter is disposed so that the end of the case in the input direction becomes flush with or rearward of the motor housing or the axle housing.

Therefore, in the terminal structure of the electric apparatus according to this aspect, if an impact load is inputted to the vehicle, the load will not be intensively inputted into the power converter, thereby securing high safety.

DETAILED DESCRIPTION OF THE DISCLOSURE

Hereinafter, several embodiments of the present disclosure will be described with reference to the accompanying drawings. Note that the following embodiments illustrate the present disclosure exemplarily, and therefore, the present disclosure is not limited in any ways by the embodiments, except for its essential configuration.

First Embodiment

1. Configuration of Vehicle V

A configuration of a vehicle V to which a terminal structure of an electric apparatus according to a first embodiment of the present disclosure is applied is described with reference to FIG. 1. Note that, below, a front-and-rear direction of the vehicle V is simply described as the “front-and-rear direction,” a left-and-right direction of the vehicle V (vehicle width direction) is simply described as the “left-and-right direction,” and an up-and-down direction of the vehicle V is simply described as the “up-and-down direction.”

Figure 1:
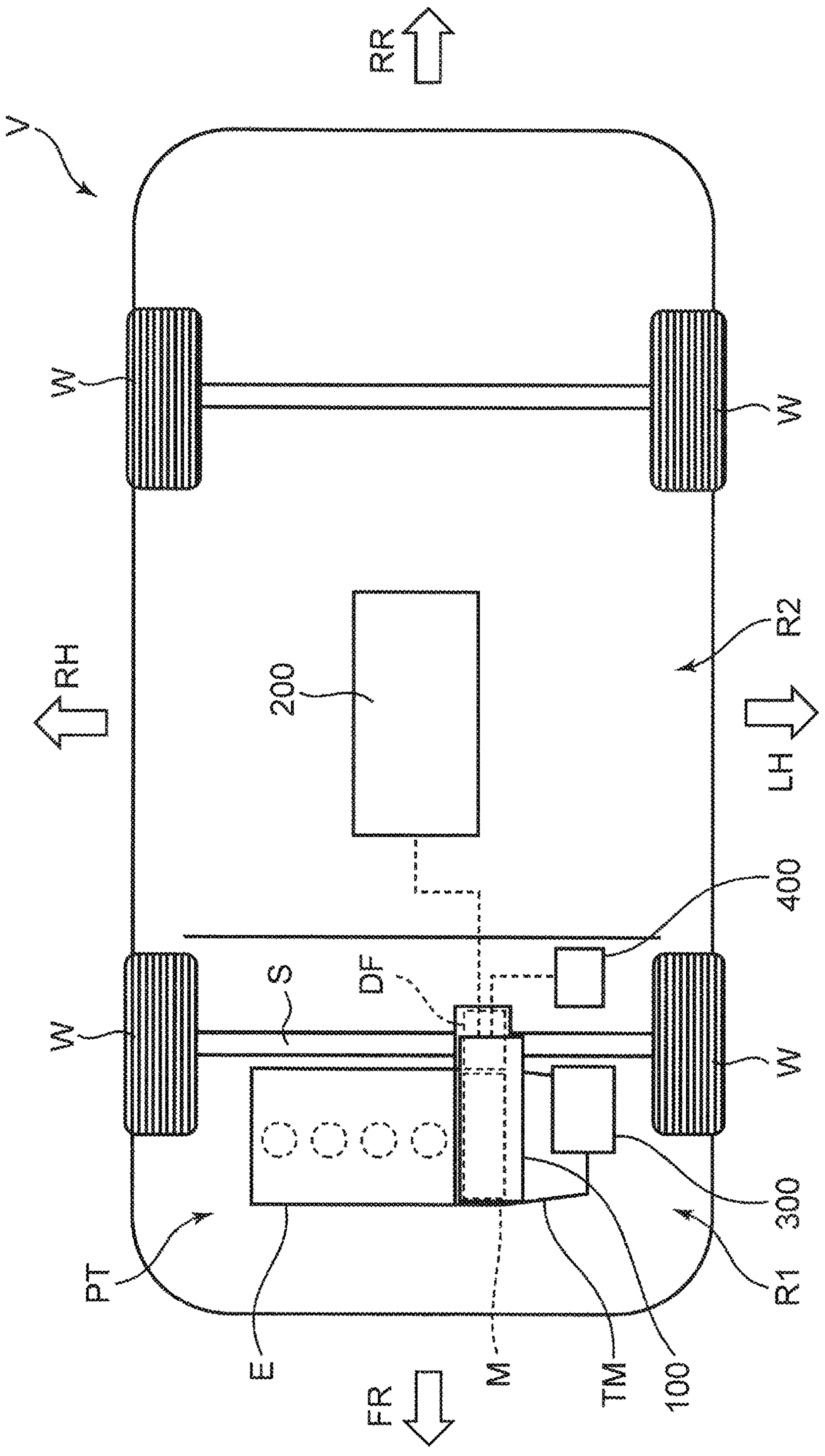
FIG. 1 is a schematic diagram illustrating a configuration of a vehicle to which a terminal structure of an electric apparatus according to a first embodiment of the present disclosure is applied.

As illustrated in FIG. 1, the vehicle V carries a powertrain PT, a power converter 100, a high-voltage battery 200, and a low-voltage battery 300.

The vehicle V is a so-called “Hybrid Electric Vehicle (HEV),” which carries an engine E and a motor M which function as a drive source for propelling (i.e., a drive source of the vehicle V (wheels W)). The powertrain PT includes the engine E and the motor M. The powertrain PT also includes a transmission TM and a differential gear DF.

The motor M is a three-phase alternating current (AC) motor which rotates in response to supply of three-phase AC power, and includes an output shaft, a rotor having permanent magnets arranged around the output shaft, and a stator which is disposed radially outward of the rotor and where coils are wound around a plurality of teeth. The plurality of coils are comprised of a U-phase coil, and a V-phase coil, and a W-phase coil, and different currents are supplied to the coils.

The transmission TM is connected with the motor M, and reduces the speed of rotation (changes the gear stage) inputted from the motor M and outputs the reduced rotation. The differential gear DF transmits the rotation outputted from the transmission TM to the wheels W via a drive shaft S.

In this embodiment, the vehicle V is a parallel-type hybrid electric vehicle as one example, which is propelled by the motor M, by the engine E, or by both the motor M and the engine E. Note that the vehicle V is capable of performing regenerative deceleration so that the motor M generates electric power by a transferring force from the wheels W when the vehicle V decelerates.

The high-voltage battery 200 is a battery which supplies and receives electric power to/from the motor M. When the motor M is used as the propelling drive source, the high-voltage battery 200 supplies electric power to the motor M. On the other hand, when the motor M is used as a generator when the vehicle V decelerates, the high-voltage battery 200 stores electric power generated by the motor M.

The power converter 100 converts direct current (DC) power from the high-voltage battery 200 into AC power, and then supplies it to the motor M. In detail, the power converter 100 converts DC power into three-phase AC power.

Further, when the motor M is used as a generator when the vehicle V decelerates, the power converter 100 converts the AC power generated by the motor M into DC power, and then supplies it to the high-voltage battery 200.

The low-voltage battery 300 is a battery for supplying electric power to electrical components provided to each part of the vehicle V. The low-voltage battery 300 is a battery which is lower in the nominal voltage than the high-voltage battery 200.

For example, the high-voltage battery 200 is a lithium-ion battery or a nickel-hydrogen battery of which the nominal voltage is 24V or higher, and the low-voltage battery 300 is a lead battery or a lithium-ion battery of which the nominal voltage is 12V or 24V.

In this embodiment, the powertrain PT, the power converter 100, and the low-voltage battery 300 are accommodated in a powertrain room R1 formed in a front part of the vehicle V. The high-voltage battery 200 is mounted under a floor of a cabin R2 formed behind the powertrain room R1.

Note that a PCM (Powertrain Control Module) 400 which is a controller for totally controlling the powertrain PT including the motor M and the engine E is also mounted on the vehicle V.

2. Layout of Power Converter 100

Figure 2:
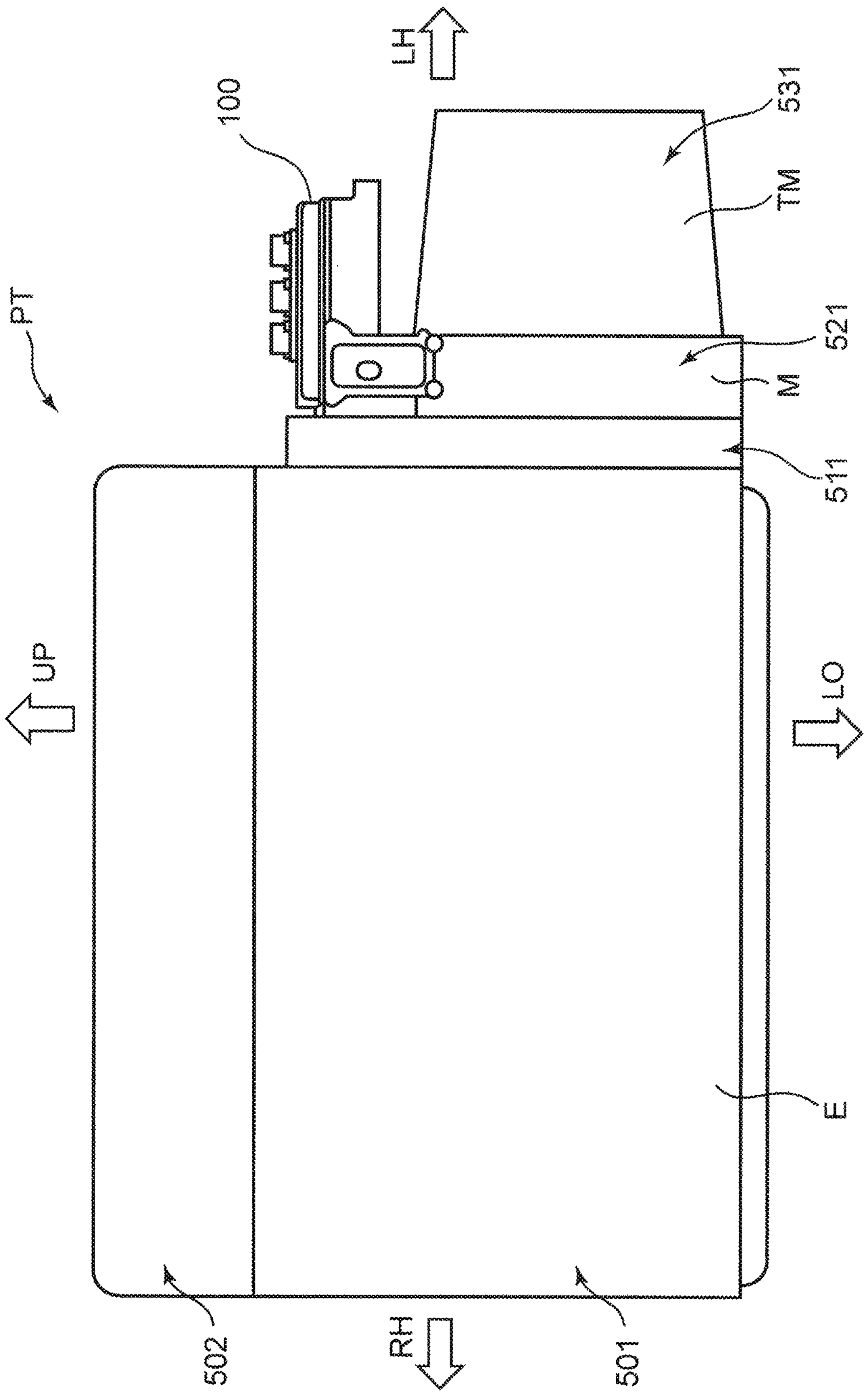
FIG. 2 is a front view illustrating a layout of a power converter.
Figure 3:
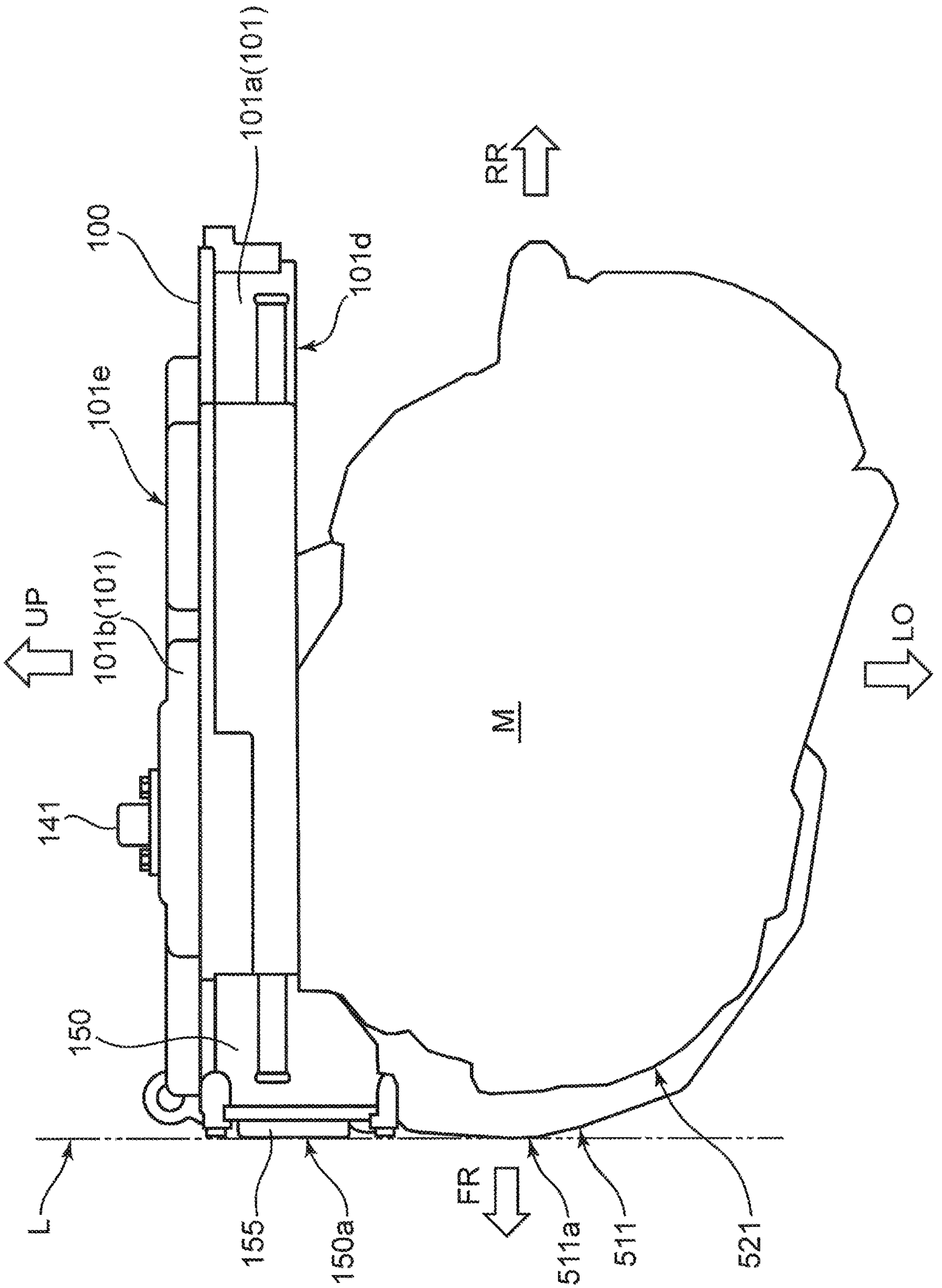
FIG. 3 is a side view illustrating the layout of the power converter.

The layout of the power converter 100 in the powertrain room R1 is described with reference to FIGS. 2 and 3. FIG. 2 is a front view of the power converter 100 and its peripheral equipment, when viewed from the front side of the vehicle V. FIG. 3 is a side view of the power converter 100 and the motor M, when viewed from the left side of the vehicle V.

As illustrated in FIG. 2, in the powertrain room R1, the engine E, the motor M, and the transmission TM are disposed in this order from the right side. The engine E includes an engine lower part 501 and an engine upper part 502 disposed above the engine lower part 501. The motor M is disposed adjacent to the engine lower part 501 of the engine E on the left side.

The motor M includes a first motor housing 511 and a second motor housing 521 as outer cells. The first motor housing 511 is joined to a left-side external surface of the engine lower part 501, and the second motor housing 521 is connected to the left side of the first motor housing 511 without a gap.

The transmission TM has an axle housing 531 as an outer cell. The axle housing 531 has a frustum shape of which the cross-sectional size is reduced gradually from the right side toward the left side.

The power converter 100 is disposed above the second motor housing 521 and the axle housing 531, in the left-and-right direction of the vehicle V. As illustrated in FIG. 3, when the motor M and the power converter 100 are viewed from the left, a lower surface 101*d* of a case 101 of the power converter 100 partially contacts the second motor housing 521, and the remainder is separated upwardly from the second motor housing 521.

The power converter 100 has an AC connector part 150 in a front part of the vehicle V. Busbars (terminals) for connection with the motor M are built inside the AC connector part 150, and the lower surface 101*d* of the case 101 is located lower than other parts of the power converter 100. A lid 155 is attached to the front side of the case 101. The lid 155 closes an opening for tool insertion formed in the front part of the case 101. The tool insertion opening will be described later.

When assuming a virtual plane L which contacts a front end part 511*a* of the first motor housing 511 of the motor M, and extends in the up-and-down direction, a front end part 150*a* (a front surface of the lid 155) of the AC connector part 150 of the power converter 100 is flush with the virtual plane L, or is located rearward of the virtual plane L.

The case 101 includes a case body 101*a* which opens upwardly, and a case lid 101*b* which closes the opening of the case body 101*a*. A PCM connector 141 protrudes upwardly from an upper surface 101*e* of the case 101. The PCM 400 (see FIG. 1) is connected to the power converter 100 via the PCM connector 141.

3. Configuration of Power Converter 100

Figure 4:
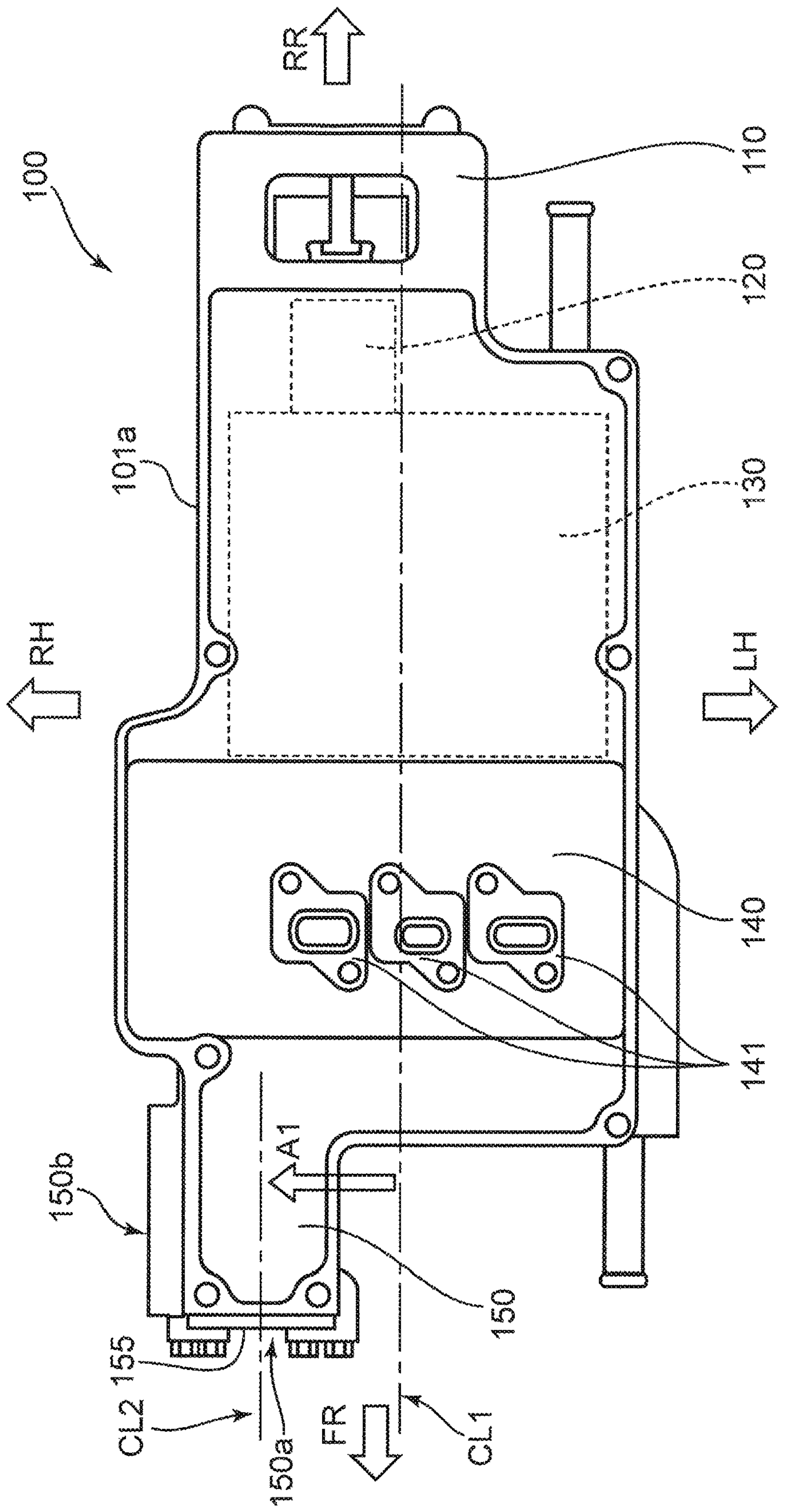
FIG. 4 is a plan view illustrating an appeared configuration of the power converter.

A configuration of the power converter 100 is described with reference to FIG. 4. FIG. 4 is a plan view of the power converter 100, viewed from above.

As illustrated in FIG. 4, the power converter 100 includes a DC connector part 110, a noise removing part 120, a smoothing part 130, a power module part 140, and the AC connector part 150, which are accommodated inside the case body 101*a* of the case 101. The DC connector part 110, the noise removing part 120, the smoothing part 130, the power module part 140, and the AC connector part 150 are disposed in this order from the rear side of the vehicle V.

The AC connector part 150 is disposed so that a center line CL2 in the left-and-right direction is offset to the right (arrow A1) from a center line CL1 of other parts of the power converter 100. That is, as illustrated in FIG. 2, the center line CL2 of the AC connector part 150 is offset to the right so that a right-side external surface 150*b* contacts the first motor housing 511 of the motor M without a gap.

The DC connector part 110 has a plurality of terminals used for connection with the high-voltage battery 200. The noise removing part 120 is a functional part for preventing leaking of noise of a high frequency component from the power converter 100, and, for example, it includes a ferrite core. The noise removing part 120 is inserted in an electric power passage between the DC connector part 110 and the smoothing part 130.

The smoothing part 130 is a functional part which smooths DC power, and it includes a smoothing capacitor (e.g., a film capacitor). The smoothing part 130 is inserted in an electric power passage between the noise removing part 120 and the power module part 140.

The power module part 140 includes a module body having a plurality of IGBTs (Insulated Gate Bipolar Transistors), and a control circuit board which is connected with the module body and electrically controls the IGBTs, etc. of the module body. The PCM connector 141 is connected to the control circuit board. A controller formed in the control circuit board controls circuitry including the IGBTs of the module body in response to a command from the PCM 400 to change a conversion amount of DC power and AC power.

Note that, in the power module part 140, the IGBTs of the module body are power semiconductors corresponding to U-phase, V-phase, and W-phase.

Although in this embodiment the module body has the plurality of IGBTs, the power module is not limited to the IGBTs. For example, known power modules, such as MOSFETs (Metal Oxide Semiconductor Field Effect Transistors), may also be adopted.

The module body of the power module part 140 is inserted in an electric power passage between the smoothing part 130 and the AC connector part 150.

The AC connector part 150 has wiring (busbars) used for electrically connecting with the motor M. The power converter 100 sends out AC power toward the motor M via the AC connector part 150. Further, when the motor M functions as the generator when the vehicle V decelerates, the power converter 100 accepts AC power from the motor M via the AC connector part 150.

When supplying AC power for propelling the vehicle to the motor M, DC power outputted from the high-voltage battery 200 is inputted into the noise removing part 120 via the DC connector part 110, and noise removal of the high frequency component is performed by the noise removing part 120. The DC power which passed the noise removing part 120 is smoothed by the smoothing part 130, and is sent out to the power module part 140.

The power module part 140 converts the DC power into three-phase AC power according to a command from the PCM 400. Then, the converted three-phase AC power is sent out to the motor M via the AC connector part 150.

On the contrary, when the motor M functions as the generator when the vehicle V decelerates, the three-phase AC power generated by the motor M is inputted into the power module part 140 via the AC connector part 150. Then, the inputted AC power is converted into DC power by the power module part 140. The converted DC power is sent out to the high-voltage battery 200 via the smoothing part 130, the noise removing part 120, and the DC connector part 110. Therefore, the high-voltage battery 200 is charged.

Note that a DC-DC converter is inserted in an electric power passage between the power converter 100 and the high-voltage battery 200.

4. Internal Configuration of AC Connector Part 150

Figure 5:
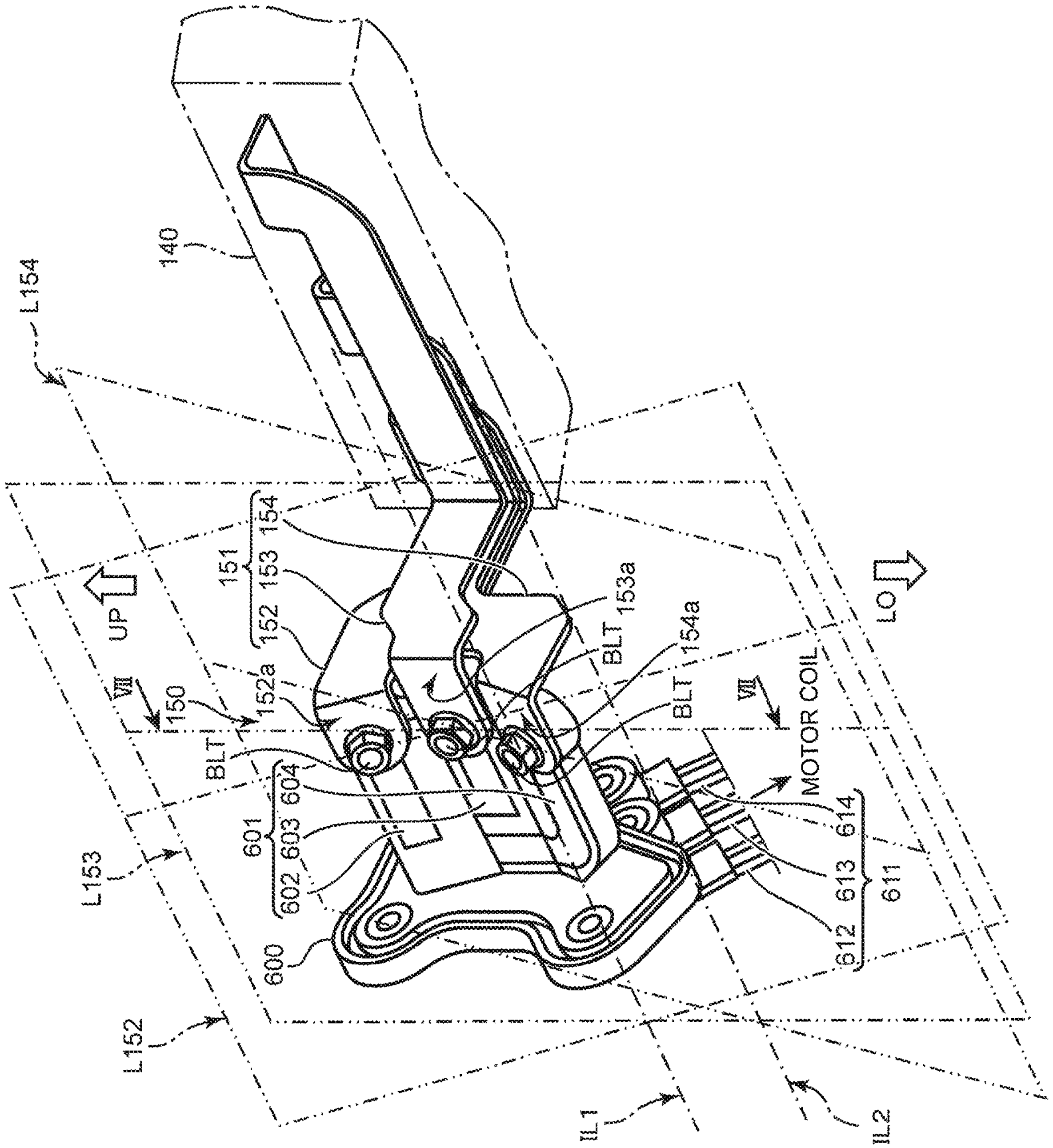
FIG. 5 is a perspective view illustrating an internal configuration of an AC connector part.
Figure 6:
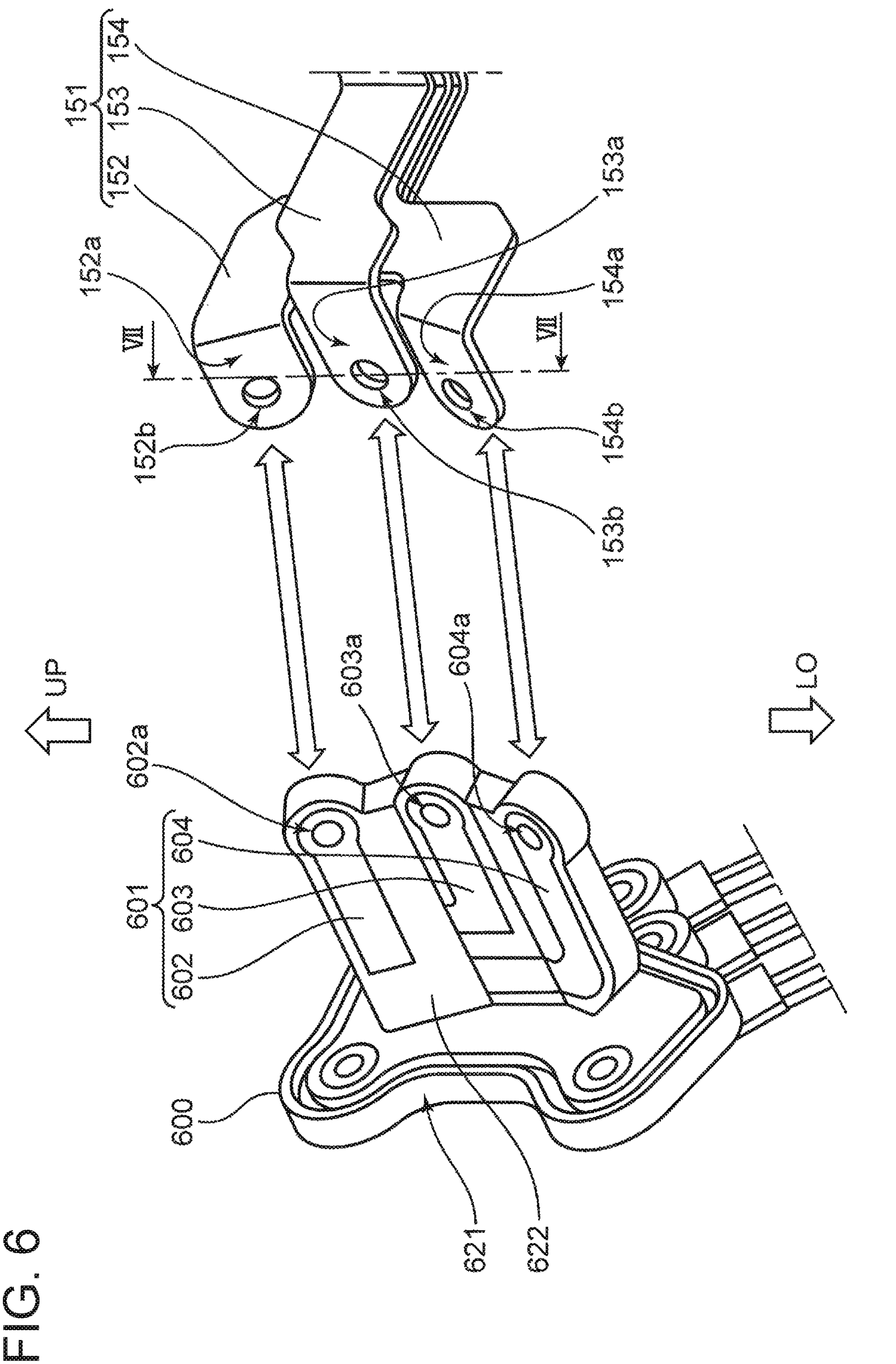
FIG. 6 is a developed perspective view illustrating the internal configuration of the AC connector part.
Figure 7:
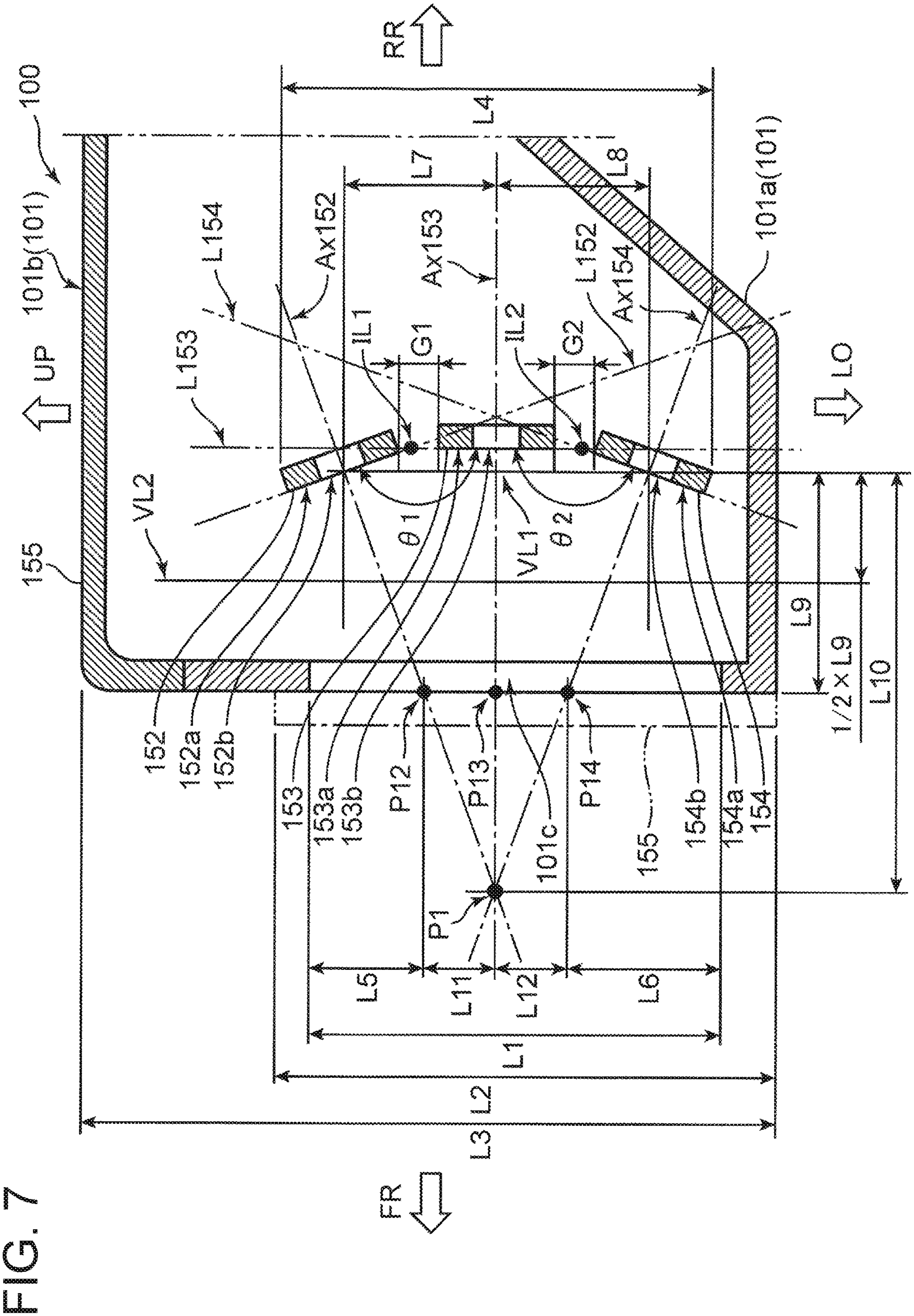
FIG. 7 is a cross-sectional view showing VII-VII line cross-section of FIGS. 5 and 6, and a cross-sectional view illustrating a layout of a connecting part of each busbar in an AC busbar.

An internal configuration of the AC connector part 150 is described with reference to FIGS. 5 to 7. FIG. 5 is a perspective view illustrating the internal configuration of the AC connector part 150, and FIG. 6 is a developed perspective view thereof. Further, FIG. 7 is a schematic cross-sectional view illustrating a layout of connecting parts 152*a*, 153*a*, and 154*a* of busbars 152-154, and the case 101.

As illustrated in FIGS. 5 and 6, the AC connector part 150 has an AC busbar 151. The AC busbar 151 is comprised of a combination of a U-phase busbar (first terminal) 152, a V-phase busbar (second terminal) 153, and a W-phase busbar (third terminal) 154. Each of the busbars 152-154 is a terminal formed using a metal plate, and the busbars 152-154 have the connecting parts 152*a*, 153*a*, and 154*a* at an end, respectively. As illustrated in FIG. 6, through-holes 152*b*, 153*b*, and 154*b* in which bolts BLT are inserted are formed in the connecting parts 152*a*, 153*a*, and 154*a*, respectively.

The U-phase busbar 152, the V-phase busbar 153, and the W-phase busbar 154 are connected with U-phase wiring 602, V-phase wiring 603, and W-phase wiring 604 of a connector part 601 of a terminal block 600 with bolts BLT, respectively.

The terminal block 600 includes a plate-shaped base part 621, and a protruded part 622 which is protruded from one of principal surfaces of the base part 621. The protruded part

622 of the terminal block 600 is inserted into a window part which is formed in the case 101 of the power converter 100.

The U-phase wiring 602, the V-phase wiring 603, and the W-phase wiring 604 are wired on one of principal surfaces of the protruded part 622 so that they are separated from each other by an insulation distance therebetween. Through-holes into which bolts BLT are inserted are formed in tip-end parts of the wiring 602-604, and fastening holes (female threaded holes) 602*a*, 603*a*, and 604*a* with which bolts BLT threadedly engage are formed in corresponding parts of the protruded part 622.

Note that a motor-side wiring 611 extending from the motor coils of the motor M is also connected to the terminal block 600. The motor-side wiring 611 is comprised of a combination of U-phase connection wiring 612 electrically connected to the U-phase wiring 602 of the protruded part 622, V-phase connection wiring 613 electrically connected to the V-phase wiring 603 of the protruded part 622, and W-phase connection wiring 614 electrically connected to the W-phase wiring 604 of the protruded part 622.

Next, as illustrated in FIG. 7, when seeing the connecting parts 152*a*, 153*a*, and 154*a* of the busbars 152-154 from the left of the vehicle V, the connecting parts 152*a*, 153*a*, and 154*a* are not located on the same flat surface. In detail, as illustrated in FIGS. 5 and 7, assume there are a virtual plane (first virtual plane) L152 along a connecting surface of the connecting part 152*a*, a virtual plane (second virtual plane) L153 along a connecting surface of the connecting part 153*a*, and a virtual plane (third virtual plane) L154 along a connecting surface of the connecting part 154*a*, respectively.

Each of the connecting surfaces of the connecting parts 152*a*, 153*a*, and 154*a* is a flat plane that extends in the depth direction perpendicular to the paper surface in FIG. 7 and faces the lid 155, when the cross section viewed from the side shown in FIG. 7 is used as the reference plane.

As illustrated in FIGS. 5 and 7, the virtual plane L152 intersects the virtual plane L153 at a line intersection IL1, and the virtual plane L153 intersects the virtual plane L154 at a line intersection IL2. The above reference plane is orthogonal to the line intersections IL1 and IL2.

Note that the reference plane can be set in any orientation, not limited to the cross-section viewed from the side shown in FIG. 7, as long as the reference plane passes through the first and second connections and the tool insertion opening and is orthogonal to the connecting surfaces of the first and second connecting parts.

As illustrated in FIG. 7, the connecting parts 152*a*, 153*a*, and 154*a* are disposed so that the virtual plane L152 intersects with the virtual plane L153 at an angle θ1, and the virtual plane L153 intersects with the virtual plane L154 at an angle θ2. Both the angle θ1 and the angle θ2 are obtuse angles (angles exceeding 90° and below 180°).

Further, a normal line (first normal line) Ax152 passing through the center of the through-hole (into which bolt BLT is inserted) 152*b* (a normal line of the connecting surface of the connecting part 152*a*), a normal line (second normal line) Ax153 passing through the center of the through-hole (into which bolt BLT is inserted) 153*b* (a normal line of the connecting surface of the connecting part 153*a*), and a normal line (third normal line) Ax154 passing through the center of the through-hole (into which bolt BLT is inserted) 154*b* (a normal line of the connecting surface of the connecting part 154*a*) are drawn. In this case, the normal lines Ax152, Ax153, and Ax154 intersect with each other in front of and outside the case 101 (intersecting point P1). Note that the case 101 of the power converter 100 includes the case body 101*a* which accommodates the busbars 152-154, the case lid 101*b* which closes the upper opening of the case body 101*a*, and the lid 155 which closes a tool insertion opening 101*c* formed in the front surface of the case body 101*a*. The tool insertion opening 101*c* of the case body 101*a* is provided in a part of the outer wall of the case body 101*a* and is an opening for inserting a tool which fastens the bolts BLT in order to connect the connecting parts 152*a*, 153*a*, and 154*a* to the wiring 602-604 (see FIGS. 5 and 6.) of the terminal block 600.

Further, the normal lines Ax152, Ax153, and Ax154 pass through the tool insertion opening 101*c* of the case body 101*a* at points (positions) P12, P13, and P14. Note that the positions P12, P13, and P14 are arranged on the opening surface along the outer surface of the case body 101*a* in the tool insertion opening 101*c*.

Further, the connecting part 152*a* and the connecting part 153*a* are disposed so that they have a gap G1 therebetween, and the connecting part 153*a* and the connecting part 154*a* are disposed so that they have a gap G2 therebetween. The gaps G1 and G2 are as small as possible, while securing insulation distances.

The distance between the intersection of the virtual plane L152 and the normal line Ax152 and the intersection of the virtual plane L153 and the normal line Ax153 is L7. The distance between the intersection of the virtual plane L153 and the normal line Ax153 and the intersection of the virtual plane L154 and the normal line Ax154 is L8. The distances L7 and L8 are set to keep the minimum distance, while keeping the insulation distance between the connecting part 152*a* and the connecting part 153*a*, and between the connecting part 153*a* and the connecting part 154*a*.

Further, the connecting parts 152*a*, 153*a*, 154*a* are arranged so that the distance L11 between the points P12 and P13 is shorter than the distance L7, and the distance L12 between the points P13 and P14 is shorter than the distance L8 in the vertical direction.

Note that, in this embodiment, the gap size between a position P12 at which the normal line Ax152 passes through the tool insertion opening 101*c* and an upper edge of the tool insertion opening 101*c* is L5, and the gap size between a position P14 at which the normal line Ax154 passes through the tool insertion opening 101*c* and a lower edge of the tool insertion opening 101*c* is L6. The distances L5 and L6 are set so that they allow the insertion of the tool which fastens the bolts BLT for connecting the wiring 602-604 (see FIG. 6, etc.) of the terminal block 600 to the connecting parts 152*a*, 153*a*, and 154*a*, respectively, and minimize the size (height in this embodiment) L1 of the tool insertion opening 101*c*.

Furthermore, assume there is a virtual plane VL1 parallel to the tool insertion opening 101*c*, passing through the intersection of the virtual plane L152 and the normal line Ax152 and the intersection of the virtual plane L154 and the normal line Ax154 for the connecting parts closest to the tool insertion opening 101*c* (the connecting part 152*a* and connecting part 154*a* in this embodiment). L9 is defined as the shortest distance to the virtual plane VL1 from the outer surface of the outer wall of the case body 101*a* where the tool insertion opening 101*c* is provided. Furthermore, assume there is a virtual plane VL2 parallel to the tool insertion opening 101*c*, passing through a point half of the distance L9 (½×L9). In this case, the intersection point P1 is located on the opposite side of the location where the connecting parts 152*a*, 154*a* are located, with respect to the virtual plane VL2.

5. Effects

In the power converter 100 according to this embodiment, the connecting part 152*a* of the U-phase busbar 152 and the connecting part 153*a* of the V-phase busbar 153 are arranged such that the distance L11 between the points (positions) P12 and P13 where the normal line (first normal line) Ax152 of the U-phase busbar 152 and the normal line (second normal line) of the V-phase busbar 153 pass through the tool insertion opening 101*c*, respectively, is shorter than the distance L7 between the intersection of the normal line Ax152 and the connecting surface in the U-phase busbar 152 and the intersection of the normal line Ax153 and the connecting surface in the V-phase busbar 153.

Further, in the power converter 100, the connecting part 153*a* of the V-phase busbar 153 and the connecting part 154*a* of the W-phase busbar 154 are arranged such that the distance L12 between the points (positions) P13 and P14 where the normal line (second normal line) Ax153 of the V-phase busbar 153 and the normal line (third normal line) of the W-phase busbar 154 pass through the tool insertion opening 101*c* respectively is shorter than the distance L8 between the intersection of the normal line ax 153 and the connecting surface in the V-phase busbar 153 and the intersection of the normal line Ax154 and the connecting surface in the W-phase busbar 154.

Figure 15:
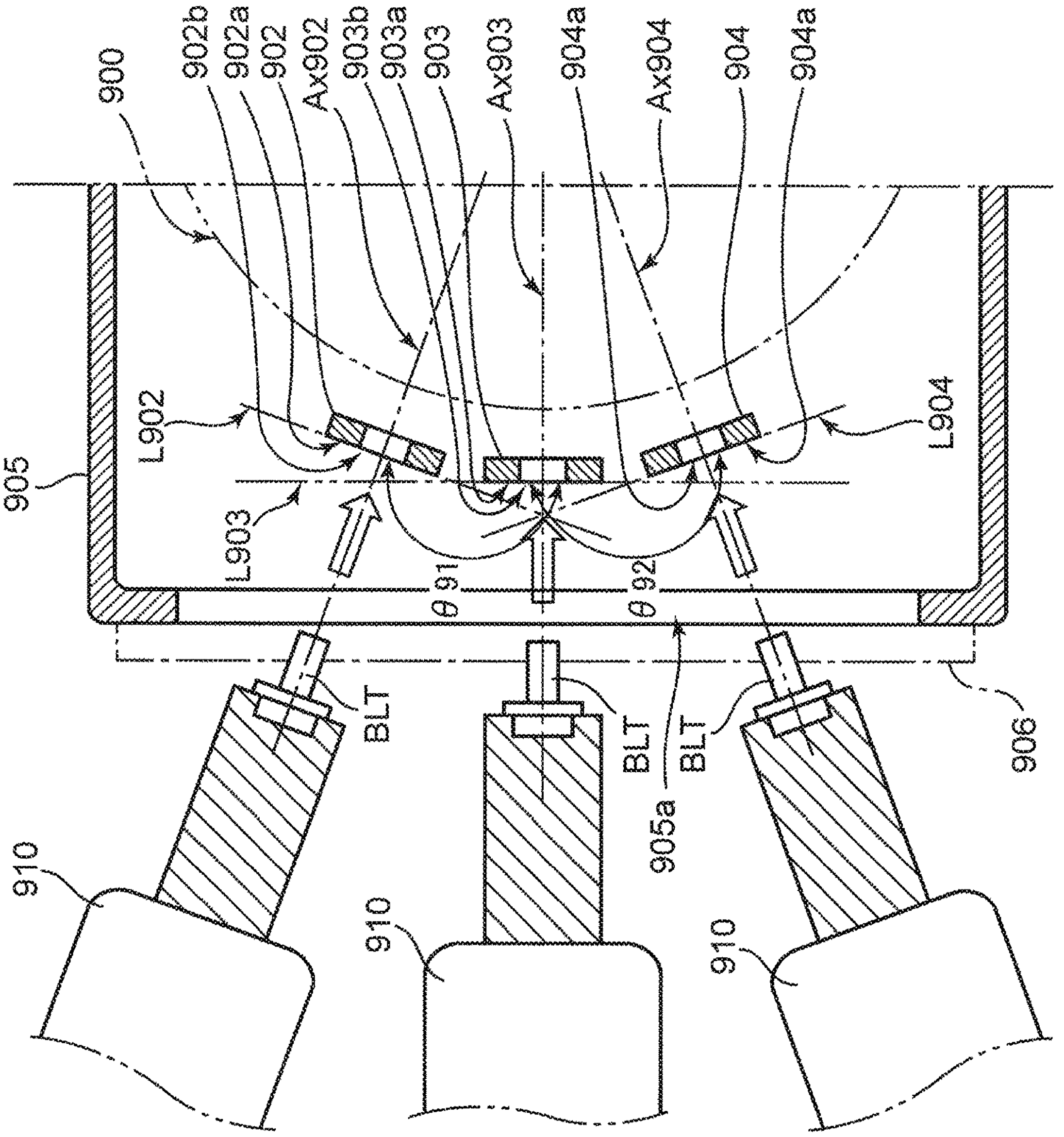
CONVENTIONAL ART FIG. 15
FIG. 15 is a cross-sectional view illustrating a layout of a connecting part of each busbar in an electric apparatus according to a conventional technology.

Therefore, in the power conversion converter 100, the size of the tool insertion opening 101*c* in the case 101 (especially, the size in the vertical direction in this embodiment) can be downsized compared to the situation where radial diffusion occurs outward, as shown in FIG. 15, and the size of the case 101 itself can be reduced.

Further, in the power converter 100 according to this embodiment, the connecting part 152*a* of the U-phase busbar 152 and the connecting part 153*a* of the V-phase busbar 153 are disposed so that the virtual planes L152 and L153 along the mutual connecting surface intersect with each other at the obtuse angle (angle θ1). Therefore, as compared with a case where the connecting parts of all the busbars are disposed so that virtual planes are parallel to each other, a space (a height L4 in FIG. 7) which the connecting parts 152*a*, 153*a*, and 154*a* of the three busbars 152-154 occupy can be reduced by amounts of inclination of the connecting part 152*a* of the U-phase busbar 152 and the connecting part 154*a* of the W-phase busbar 154 with respect to the connecting part 153*a* of the V-phase busbar 153. That is, as illustrated by the comparative example in FIG. 14, when connecting parts 952*a*, 953*a*, and 954*a* of three busbars 952-954 are located on the same virtual plane L951, a space (a height L94 in FIG. 14) which the three busbars 952, 953, and 954 occupy becomes larger than the height L4, if the gaps between the connecting parts 952*a* and 953*a* and 954*a* are the same.

On the other hand, in the power converter 100 according to this embodiment, the space (the height L4 of FIG. 7) which the connecting parts 152*a*, 153*a*, and 154*a* of the three busbars 152-154 occupy can be reduced by amounts of inclination of the connecting part 152*a* of the U-phase busbar 152 and the connecting part 154*a* of the W-phase busbar 154 with respect to the connecting part 153*a* of the V-phase busbar 153.

Therefore, in the power converter 100 according to this embodiment, the case 101 which accommodates the three busbars 152-154 can be downsized.

Further, in the power converter 100, the normal lines Ax152, Ax153, and Ax154 are disposed so that they pass through the tool insertion opening 101*c* of the case body 101*a* and intersect with each other at the point P1 located outside the case 101 (outside the tool insertion opening 101*c*). Therefore, compared with a case where three normal lines Ax952, Ax953, and Ax954, which pass through the center of through-holes 952*b*, 953*b*, and 954*b*, are parallel to each other as the comparative example illustrated in FIG. 14, and a case where three normal lines Ax902, Ax903, and Ax904 spread radially outwardly as illustrated in FIG. 15, the size (height) L1 of the tool insertion opening 101*c* of the case body 101*a* can be reduced. For this reason, the size (height) L2 of the lid 155 and the size (height) L3 of the case 101 can be reduced.

Further, in the power converter 100, since the gaps G1 and G2 between the adjacent connecting parts 152*a*, 153*a*, and 154*a* are set more than the insulation distance, it is not necessary to insert insulators, such as ribs, into the gaps between the connecting parts 152*a*, 153*a*, and 154*a*. For this reason, even if the virtual planes L152, L153, and L154 intersect with each other at the obtuse angle in a dented manner, the tool can be inserted easily to the connecting parts 152*a*, 153*a*, and 154*a*, and the manufacturing cost can be reduced. Note that if the gaps G1 and G2 between the adjacent connecting parts 152*a*, 153*a*, and 154*a* are the minimum distances more than the insulation distance, it is advantageous to reduce the external size of the power converter 100.

Further, as illustrated in FIG. 7, in the power converter 100, since the size (height) L1 of the tool insertion opening 101*c* of the case body 101*a* is set shorter than the height L4 according to the vertical layout of the connecting parts 152*a*, 153*a*, and 154*a* of the three busbars 152-154, the tool insertion opening 101*c* for inserting the tool in a narrow area can be provided. Therefore, it is further advantageous to reduce the size (height) L2 of the lid 155 and the size (height) L3 of the case 101 of the power converter 100.

Figure 14:
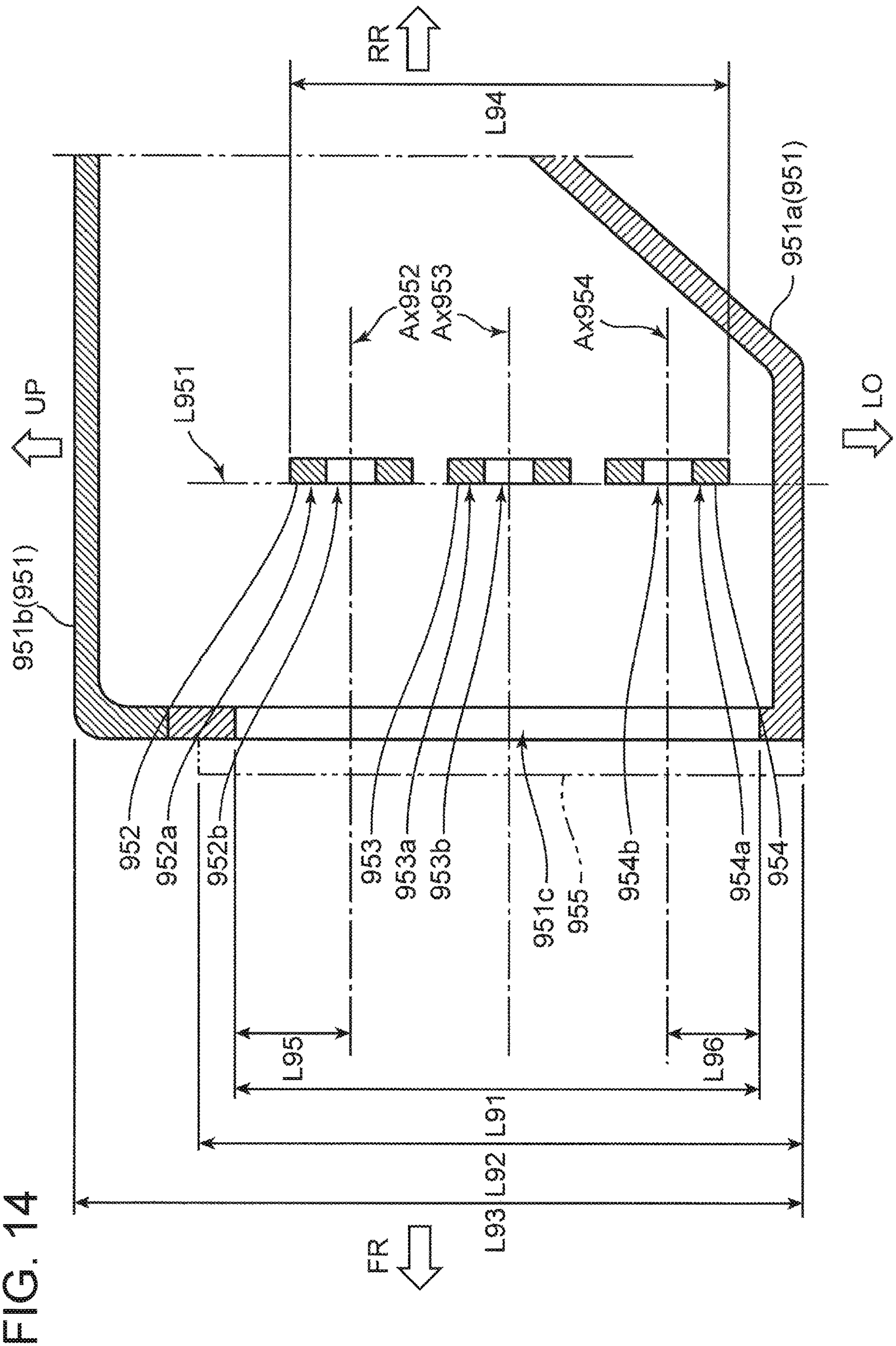
FIG. 14 is a cross-sectional view illustrating a layout of a connecting part of each busbar in an AC connector part according to a comparative example.

Note that, in the comparative example illustrated in FIG. 14, since the connecting surfaces (the flat surfaces facing a lid 955) of the connecting parts 952*a*, 953*a*, and 954*a* are arranged along the same virtual plane L951, the vertical layout height (height) L94 of the connecting parts 952*a*, 953*a*, and 954*a* becomes longer than the height L4 according to the layout of this embodiment. Further, in the comparative example, since the connecting parts 952*a*, 953*a*, and 954*a* are disposed so that the normal lines Ax952, Ax953, and Ax954 are parallel to each other, the size (height) L91 of a tool insertion opening 951*c* of a case body 951*a* must become longer than the size L1 of this embodiment, and it becomes necessary to make a size (height) L93 of a case 951 which is comprised of the lid 955, and the case body 951*a* and a case lid 951*b* larger than that of this embodiment.

Note that when a gap size L95 between the normal line Ax952 and an upper edge of the tool insertion opening 951*c* and a gap size L96 between the normal line Ax954 and a lower edge of the tool insertion opening 951*c* in FIG. 14 are the same as the distance L5 and the distance L6 illustrated in FIG. 7, respectively, it is necessary to make the size (height) L91 of the tool insertion opening 951*c*, a size (height) L92 of the lid 955, and the size (height) L93 of the case 951 larger than those of this embodiment illustrated in FIG. 7, because the normal lines Ax952 and Ax954 are not inclined like in this embodiment.

In this embodiment, the power converter 100 is carried in the powertrain room R1 of the vehicle V, and, as illustrated in FIG. 3, etc., the tool insertion opening 101*c* of the case body 101*a* is disposed so that it is oriented to the front of the vehicle V (an input direction of expected load to the vehicle V). Further, the case 101 of the power converter 100 is disposed so that an end part of the vehicle V (the front end part 150*a* of the AC connector part 150) becomes flush with the front end part 511*a* of the first motor housing 511.

Therefore, in the power converter 100, if an impact load is inputted to the vehicle V from the front, the load will not be intensively inputted into the power converter 100, thereby securing high safety.

Note that, in this embodiment, although the front end part 150*a* of the case 101 of the power converter 100 is disposed so that it becomes flush with the front end part 511*a* of the first motor housing 511 (with the virtual plane L in FIG. 3), higher safety can be secured by disposing the front end part 150*a* of the case 101 of the power converter 100 rearward of the front end part 511*a* of the first motor housing 511.

As described above, in the power converter 100 according to this embodiment, the external size of the case 101 can be reduced, while the three busbars 152-154 for the electric connection with the motor M as external apparatuses are provided inside the case 101.

Second Embodiment

A power converter 160 according to a second embodiment of the present disclosure is described with reference to FIGS. 8 and 9. Note that the power converter 160 according to this embodiment is also one example of the electric apparatus, and it is different from the first embodiment only in the layout of connecting parts 252*a*, 253*a*, and 254*a* of busbars (wiring) 252-254 comprising an AC bus bar 251 in an AC connector section 250, and other configurations are the same as those of the first embodiment. For this reason, in FIGS. 8 and 9, the connecting parts 252*a*, 253*a*, and 254*a* of the busbars 252-254, and their peripheries are selectively illustrated. Further, below, explanation of those overlapping with the first embodiment is omitted.

Figure 8:
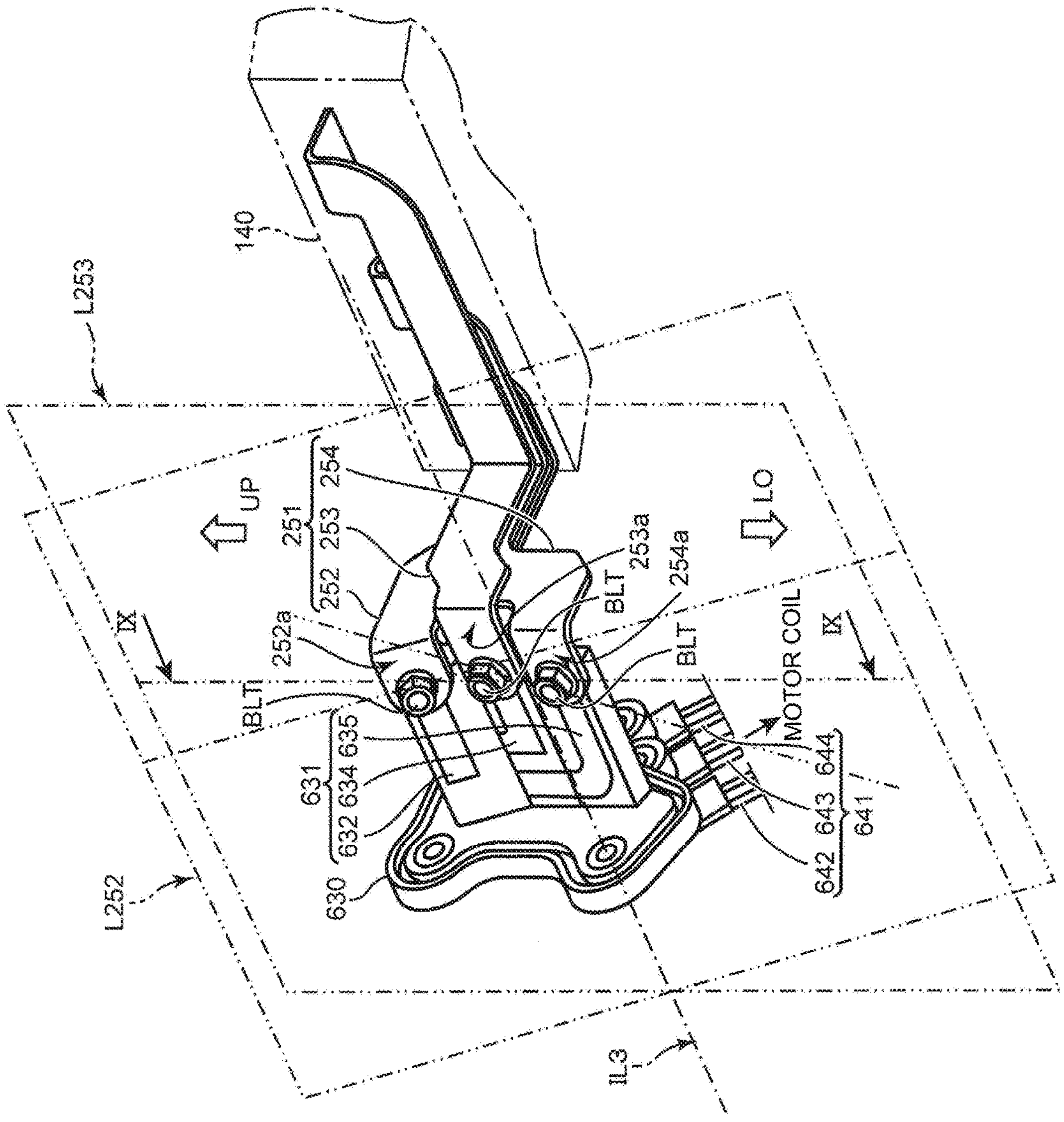
FIG. 8 is a perspective view illustrating an internal configuration of an AC connector part in a terminal structure of an electric apparatus according to a second embodiment of the present disclosure.

As illustrated in FIG. 8, the AC connector section 250 the power converter 160 according to this embodiment has the AC busbar 251. The AC busbar 251 consists of the combination of the U-phase busbar (terminal) 252, V-phase busbar (terminal) 253, and W-phase busbar (terminal) 254. Each busbar 252-254 is also a terminal formed using metal material and has connecting parts 252*a*, 253*a*, and 254*a* at the ends. As shown in FIG. 8, each busbar 252 to 254 is connected to the wires 632 to 634 in the connector section 631 of the terminal block 630 at the connecting parts 252*a*, 253*a*, 254*a* using bolts BLT. As shown in FIG. 9, each connecting part 252*a*, 253*a*, 254*a* has a through-hole 252*b*, 253*b*, 254*b* that permits insertion of a bolt BLT.

Note that wiring 641 (connection wiring 642 to 644) on the motor side extending from the motor coil of the motor M is also connected to the terminal block 630.

Figure 9:
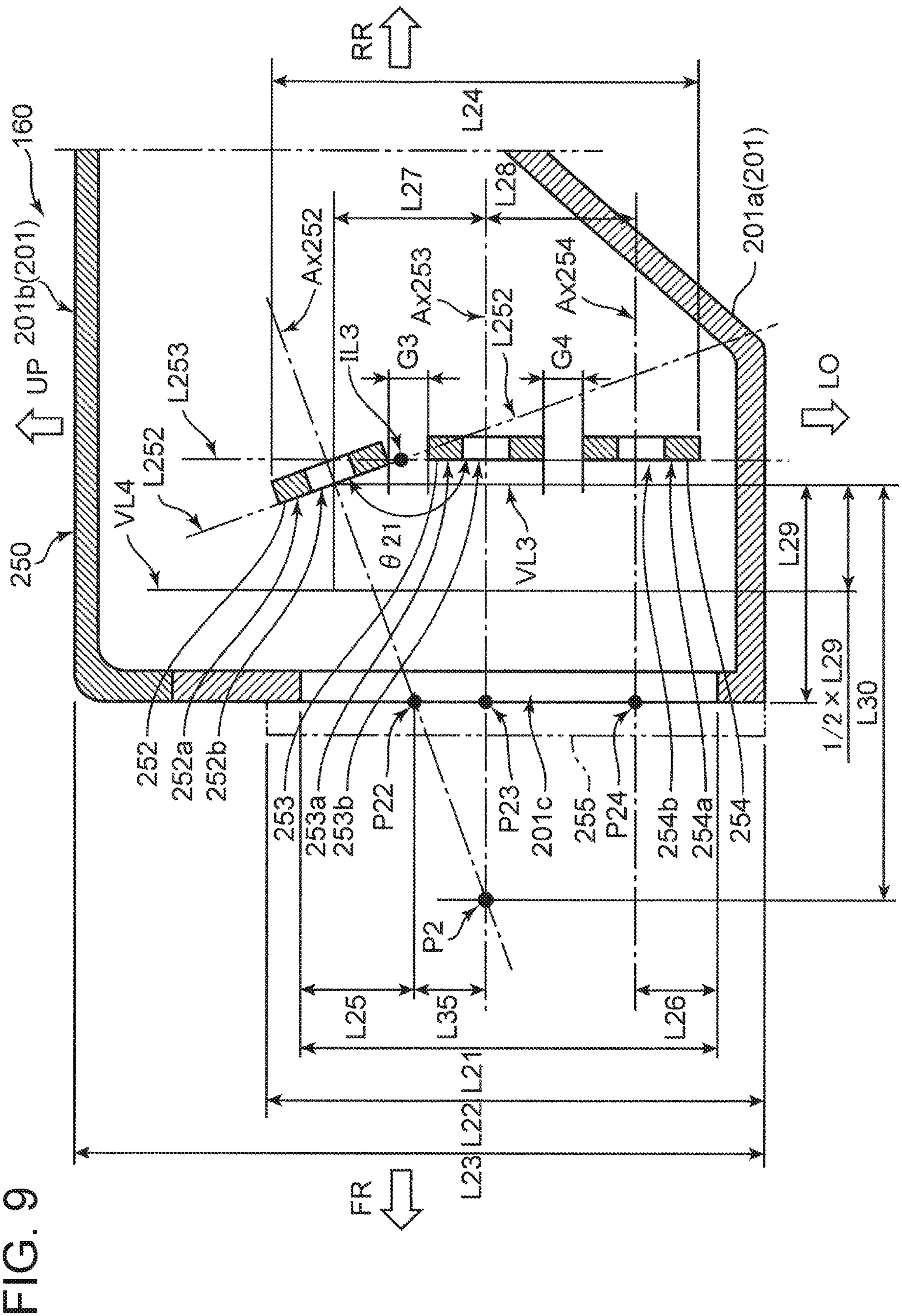
FIG. 9 is a cross-sectional view showing IX-IX line cross-section of FIG. 8, and a cross-sectional view illustrating a layout of a connecting part of each busbar.

As illustrated in FIG. 9, when viewing the connecting parts 252*a*, 253*a*, and 254*a* of the busbars 252-254 from the left of the vehicle V, the connecting part 252*a* and the connecting part 253*a* are not located on the same flat surface, but the connecting part 253*a* and the connecting part 254*a* are located on the same flat surface. In detail, as shown in FIGS. 8 and 9, assume there are a virtual plane (first virtual plane) L252 along the connecting surface of the connecting part 252*a* and a virtual plane (second virtual plane) L253 along the connecting surfaces of the connecting parts 253*a* and 254*a*, respectively.

As in the first embodiment above, each connecting surface of the connecting parts 252*a*, 253*a*, and 254*a* is a flat plane that extends in the depth direction orthogonal to the paper surface of FIG. 9 and faces the lid 255, when the cross section viewed from the side shown in FIG. 9 is used as the reference plane.

As illustrated in FIGS. 8 and 9, the virtual plane L252 and virtual plane L253 intersect at intersection IL3. The above reference plane is orthogonal to the intersection IL3.

Note that, as in the first embodiment above, the reference plane can be set in any orientation, not limited to the cross-section viewed from the side shown in FIG. 9, as long as the reference plane passes through both the first and second connecting parts and the tool insertion opening, and is orthogonal to the connecting surfaces of both the first and second connecting parts.

As illustrated in FIG. 9, the connecting part 252*a* and the connecting part 253*a* are disposed so that the virtual plane L252 and the virtual plane L253 intersect with each other at an angle θ21. The angle θ21 is an obtuse angle (an angle exceeding 90° and below 180°).

On the other hand, the connecting surface (the flat surface facing the tool insertion opening 201*c*) of the connecting part 254*a* is oriented along the virtual plane L253. That is, in this embodiment, the connecting surface of the connecting part 253*a* and the connecting surface of the connecting part 254*a* are oriented along one virtual plane L253.

A normal line of the connecting surface of the connecting part 252*a* (a normal line (first normal line) Ax252 passing through the center of a through-hole 252*b*), a normal line of the connecting surface of the connecting part 253*a* (a normal line (second normal line) Ax253 passing through the center of a through-hole 253*b*), and a normal line of the connecting surface of the connecting part 254*a* (a normal line (third normal line) Ax254 passing through the center of a through-hole 254*b*) are drawn. In this case, the normal line Ax252 and the normal line Ax253 intersect with each other in front of and outside a case 201 (at an intersecting point P2).

On the other hand, the connecting part 253*a* and the connecting part 254*a* are disposed so that the normal line Ax253 and the normal line Ax254 are substantially parallel to each other.

Note that the case 201 of the power converter 160 also opens upwardly, and includes a case body 201*a* which accommodates the busbars 252-254, and a case lid 201*b* which closes the opening of the case body 201*a*. In a part of the outer wall at the front side of the case body 201*a*, the tool insertion opening 201*c* for inserting the tool which fastens the bolts BLT for connecting the connecting parts 252*a*, 253*a*, and 254*a* to the wiring 602-604 of the terminal block 600 (see FIGS. 5 and 6.) is formed. Further, the power converter 160 is also provided with the lid 255 which closes the tool insertion opening 201*c*.

The normal lines Ax252, Ax253, and Ax254 pass through the tool insertion opening 201*c* of the case body 201*a* at points (positions) P22, P23, and P24. The points P22, P23, and P24 are located on the opening surface along the outer surface of the case body 201*a* in the tool insertion opening 201*c*.

The connecting part 252*a* and the connecting part 253*a* are disposed so that a gap G3 is formed therebetween, and the connecting part 253*a* and the connecting part 254*a* are disposed so that a gap G4 is formed therebetween. The gaps G3 and G4 are set as small as possible, while securing the insulation distance. The distance between the intersection of the virtual plane L252 and normal line Ax252 and the intersection of virtual plane L253 and normal Ax253 is L27. The distance between the intersection of the virtual plane L253 and normal line Ax253 and the intersection of virtual plane L253 and normal line Ax254 is L28. The distances L27 and L28 are set to be the minimum distances, while maintaining an insulation distance between the connecting parts 252*a* and 253*a*, and between the connecting parts 253*a* and 254*a*.

Further, the connecting parts 252*a* and 253*a* are arranged so that the distance L35 between points P22 and P23 in the vertical direction is shorter than the distance L27.

Note that, in this embodiment, a distance (gap size) between a point (position) P22 at which the normal line Ax252 passes through the tool insertion opening 201*c* and an upper edge of the tool insertion opening 201*c* is L25, and a distance (gap size) between a point (position) P24 at which the normal line Ax254 passes through the tool insertion opening 201*c* and a lower edge of the tool insertion opening 201*c* is L26. The distances L25 and L26 are set so that insertion of the tool which fastens the bolts BLT for connecting the wiring 602-604 of the terminal block 600 (see FIG. 6.) to the connecting parts 252*a*, 253*a*, and 254*a* is allowed, and a size (height) L21 of the tool insertion opening 201*c* is minimized.

Furthermore, for the connecting part closest to the tool insertion opening 201*c* (in this case, connecting part 252*a*), assume there is a virtual plane VL3 parallel to the tool insertion opening 201*c*, passing through the intersection of the virtual plane L252 and the normal line Ax252 (intersection of the reference plane and the intersection line IL3). The shortest distance to the virtual plane VL3 from the outer surface of the outer wall of the case body 201*a* where the tool insertion opening 201*c* is provided is L29. Furthermore, assume there is a virtual plane VL4 passing through a point at half the distance L29 (½×L29) and parallel to the tool insertion opening 201*c*. In this case, the intersection point P2 is located on the opposite side of the location where the connection 252*a* is located, with respect to the virtual plane VL4.

Also in the power converter 160 according to this embodiment, the connecting part 252*a* of the U-phase busbar 252 and the connecting part 253*a* of the V-phase busbar 253 are disposed so that the virtual planes L252 and L253 along the mutual connecting surface intersect with each other at an obtuse angle (angle θ21). Therefore, as compared with the comparative example (see FIG. 14) in which the connecting parts of all the busbars are disposed so that the virtual planes are parallel to each other, a space (a height L24 of FIG. 9) which the connecting parts 252*a*, 253*a*, and 254*a* of the three busbars 252-254 occupy can be reduced in the size by an amount of the relative inclination of the connecting part 252*a* of the U-phase busbar 252 with respect to the connecting part 253*a* of the V-phase busbar 253. That is, when the connecting parts 952*a*, 953*a*, and 954*a* of the three busbars 952-954 are located on the same virtual plane L951 like in the comparative example illustrated in FIG. 14, the space (the height L94 of FIG. 14) which the three busbars 952, 953, and 954 occupy becomes larger than the size L24, if the gaps between the connecting parts 952*a*, 953*a*, and 954*a* are the same.

On the other hand, in the power converter 160 according to this embodiment, the space (the height L24 of FIG. 9) which the connecting parts 252*a*, 253*a*, and 254*a* of the three busbars 252-254 occupy can be reduced in the size by an amount of the relative inclination of the connecting part 252*a* of the U-phase busbar 252 with respect to the connecting part 253*a* of the V-phase busbar 253.

Further, in the power converter 160, the normal lines Ax252 and Ax253 are disposed so that they pass through a tool insertion opening 201*c* of the lid 255 and intersect with each other at the point P2 located outside the case 201 (outside the tool insertion opening 201*c*). Therefore, as compared with the case where the three normal lines Ax952, Ax953, and Ax954 are parallel to each other like the comparative example illustrated in FIG. 14, and the case where three normal lines Ax902, Ax903, and Ax904 radially spread outwardly as illustrated in FIG. 15, the size (height L21) of the tool insertion opening 201*c* of the case body 201*a* can be reduced. For this reason, a size (height L22) of the lid 255 which closes the tool insertion opening 201*c*, and a size (height) L23 of the case 201 which is comprised of a combination of the case body 201*a* and the case lid 201*b* can be reduced.

Further, also in the power converter 160, since the gaps G3 and G4 of the adjacent connecting parts 252*a*, 253*a*, and 254*a* are set more than the insulation distance, the same effects as the first embodiment can be achieved. Note that, also in this embodiment, by setting the gaps G3 and G4 between the adjacent connecting parts 252*a*, 253*a*, and 254*a* as the minimum distance more than the insulation distance, it is advantageous to reduce the external size of the power converter 160.

Third Embodiment

A power converter 170 according to a third embodiment of the present disclosure is described with reference to FIGS. 10 and 11. Note that the power converter 170 according to this embodiment is also one example of the electric apparatus, which differs from the first and second embodiments only in the layout of connecting parts 352*a* and 353*a* of busbars (wiring) 352 and 353, and is the same as the first and second embodiments in other configurations. For this reason, in FIG. 11, the connecting parts 352*a* and 353*a* of the busbars 352 and 353, and their peripheries are selectively illustrated. Further, below, explanation of those overlapping with the first and second embodiments is omitted.

Figure 10:
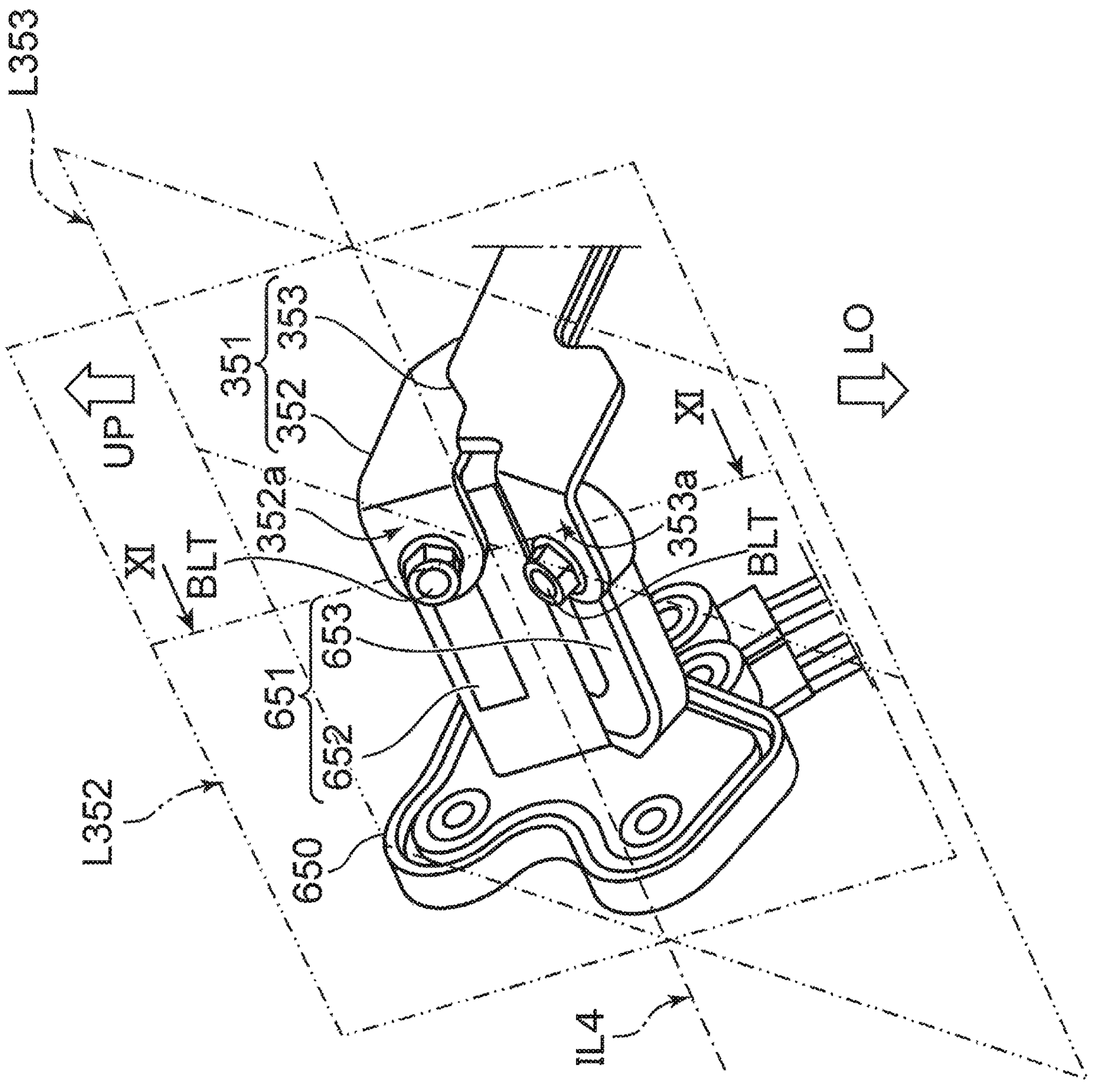
FIG. 10 is a perspective view illustrating an internal configuration of an AC connector part in a terminal structure of an electric apparatus according to a third embodiment of the present disclosure.

As illustrated in FIG. 10, in the power converter 170 according to this embodiment, an AC connector part 350 has an AC busbar 351. The AC busbar 351 includes the two busbars 352 and 353. That is, the power converter 170 according to this embodiment performs output and input of AC power to/from an external apparatus (motor, etc.) with a single-phase two-wire system. One of the busbars 352 and 353 is a voltage line, and the other busbar is a neutral line. Each busbar 352, 353 is also a terminal formed using metal material and has the connecting parts 352*a*, 353*a* at the end part.

Figure 11:
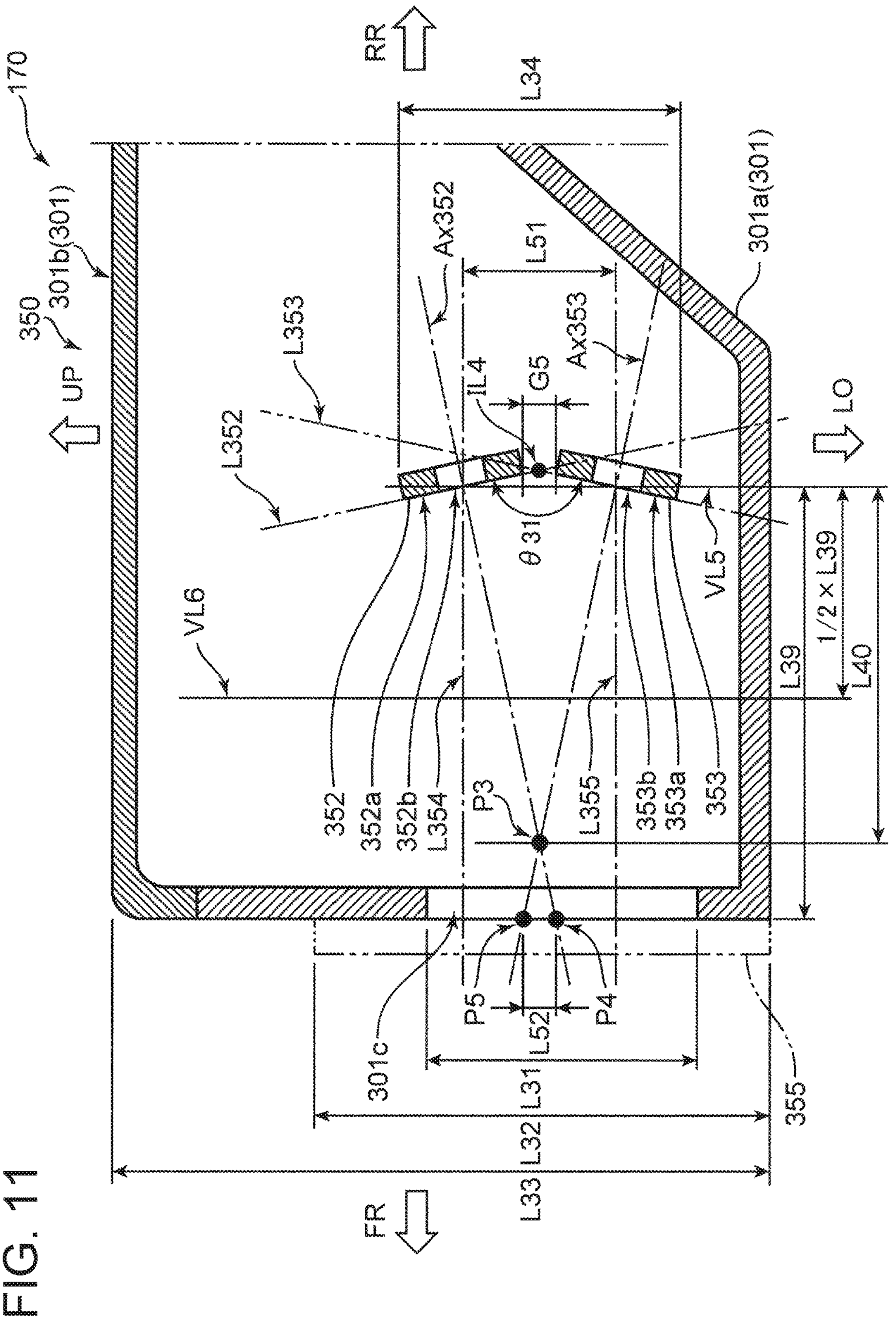
FIG. 11 is a cross-sectional view showing XI-XI line cross-section of FIG. 10, and a cross-sectional view illustrating a layout of a connecting part of each busbar.

As illustrated in FIGS. 10 and 11, each busbar 352, 353 is connected to the wires 652, 653 in the connector section 651 of the terminal block 650 at the connecting parts 352*a*, 353*a* using bolts BLT. Each connecting part 352*a*, 353*a* has a through-hole 352*b*, 353*b* that permits insertion of a bolt BLT.

In the power converter 170 according to this embodiment, when seeing the connecting parts 352*a* and 353*a* of the busbars 352 and 353 from the left of the vehicle V, the connecting part 352*a* and the connecting part 353*a* are not located on the same flat surface. In detail, as shown in FIGS. 10 and 11, assume there are a virtual plane (first virtual plane) L352 along the connecting surface of the connecting part 352*a* and a virtual plane (second virtual plane) L353 along the connecting surface of the connecting part 353*a*.

Each of the connection surfaces of the connecting parts 352*a* and 353*a* is a flat plane that extends in the depth direction perpendicular to the paper surface of FIG. 11 and faces toward the lid 355, when the cross section viewed from the side shown in FIG. 11 is used as the reference plane.

As illustrated in FIGS. 10 and 11, the virtual plane L352 intersects the virtual plane L353 at the intersection IL4. The above reference plane is orthogonal to the intersection IL4.

The reference plane can be set in any orientation, not limited to the cross-section viewed from the side shown in FIG. 11, as long as the reference plane passes through both the first and second connecting parts and the tool insertion opening and is orthogonal to the connecting surfaces of both the first and second connecting parts.

Further, the connecting part 352*a* and the connecting part 353*a* are disposed so that the virtual plane L352 and the virtual plane L353 intersect with each other at an angle θ31. The angle θ31 formed between the virtual plane L352 and the virtual plane L353 is an obtuse angle (an angle exceeding 90° and below 180°), as in the first and second embodiments.

Further, a normal line of the connecting surface of the connecting part 352*a* (a normal line (first normal line) Ax352 passing through the center of a through-hole 352*b*), and a normal line of the connecting surface of the connecting part 353*a* (a normal line (second normal line) Ax353 passing through the center of a through-hole 353*b*) are drawn. In this case, the normal line Ax352 and the normal line Ax353 intersect at a point P3 located inside a case 301, which is inward of a tool insertion opening 301*c* formed in a case body 301*a*.

The case 301 of the power converter 170 also opens upwardly, and includes the case body 301*a* which accommodates the busbars 352 and 353, and a case lid 301*b* which closes the opening of the case body 301*a*. The tool insertion opening 301*c* for inserting a tool which fastens the bolts BLT for connecting the connecting parts 352*a* and 353*a* to the wiring 652, 653 of the terminal block 650 (see FIG. 10) is formed in a part of the outer wall at the front side of the case body 301*a*.

The normal lines Ax352 and Ax353 pass through the tool insertion opening 301*c* of the case body 301*a* at the points (positions) P5 and P6. The points P5 and P6 are located on the opening surface along the outer surface of the case body 301*a* in the tool insertion opening 301*c*.

The connecting part 352*a* and the connecting part 353*a* are disposed with a gap G5 therebetween. The gap G5 is set as small as possible, while securing the insulation distance.

For the connecting parts closest to the tool insertion opening 301*c* (in this case, connections 352*a* and 353*a*), assume there is a virtual plane VL5 parallel to the tool insertion opening 301*c*, passing through the intersection of the virtual plane L352 with the normal line Ax352 and the intersection of the virtual plane L353 with the normal line Ax353. Further, L39 is the shortest distance to the virtual plane VL5 from the outer surface of the outer wall of the case body 301*a* where the tool insertion opening 301*c* is provided. Furthermore, assume there is a virtual plane VL6 parallel to the tool insertion opening 301*c*, passing through a point half of the distance L39 (½×L39). In this case, the intersection point P3 is located on the opposite side of the side on which the connections 352*a*, 353*a* are located, with respect to the virtual plane VL6.

Further, in the power converter 170 according to this embodiment, the connecting part 352*a* of the busbar 352 and the connecting part 353*a* of the busbar 353 are disposed so that the virtual planes L352 and L353 along the mutual connecting surface intersect with each other at an obtuse angle (angle θ31). Therefore, as compared with the comparative example (see FIG. 14) in which the connecting parts of all the busbars are disposed so that the virtual planes are parallel to each other, a space (height L34 in FIG. 11) which the connecting parts 352*a* and 353*a* of the busbars 352 and 353 occupy can be reduced in the size by an amount of the relative inclination of the connecting part 352*a* of the busbar 352 with respect to the connecting part 353*a* of the busbar 353.

Further, in the power converter 170, since the normal lines Ax352 and Ax353 intersect with each other at the point P3 inside the case body 301*a* (inward of the tool insertion opening 301*c*), a size (height) L31 of the tool insertion opening 301*c* of the case body 301*a* can be reduced, as compared with the case where the three normal lines Ax952, Ax953, and Ax954 are parallel to each other like the comparative example illustrated in FIG. 14, and the case where the three normal lines Ax902, Ax903, and Ax904 radially spread outwardly as illustrated in FIG. 15. The reason is as follows.

As illustrated in FIG. 11, a position at which the normal line Ax352 passes through the tool insertion opening 301*c* is set as a point P4, and a position at which the normal line Ax353 passes through the tool insertion opening 301*c* is set as a point P5. Further, an imaginary line (the first imaginary line) L354 which passes through the center of the through-hole 352*b* of the connecting part 352*a* and extends horizontally (the second direction), and an imaginary line (the second imaginary line) L355 which passes through the center of the through-hole 353*b* of the connecting part 353*a* and extends horizontally are drawn. In this case, the points (positions) P3, P4, and P5 are set so that both the points (positions) P4 and P5 are located in an area between the imaginary line L354 and the imaginary line L355 in the up-and-down direction (the first direction).

The connecting parts 352, 353 are arranged so that the distance L52 between the points P4 and P5 in the vertical direction is shorter than the distance L51 between the virtual line L354 and the virtual line L355 (the distance between the intersection of the connecting surface of connecting part 352*a* and the normal line Ax352 and the intersection of the connecting surface of connecting part 353*a* and the normal line Ax353).

By setting the point (position) P3 as described above, the size (height) L31 of the tool insertion opening 301*c* can be minimized, while allowing insertion of the tool, even if the intersecting point (intersecting position) P3 of the normal line Ax352 and the normal line Ax353 is located inside the case body 301*a* unlike the first and second embodiments. Therefore, a size (height) L32 of the lid 355 which closes the tool insertion opening 301*c*, and a size (height) L33 of the case 301 constituted by the combination of the case body 301*a* and the case lid 301*b* can be reduced.

Further, also in the power converter 170, since the gap G5 between the connecting parts 352*a* and 353*a* are set more than the insulation distance, the same effects as the first and second embodiments can be achieved. Note that, also in this embodiment, when the gap G5 between the connecting parts 352*a* and 353*a* are set as the minimum distance more than the insulation distance, it is advantageous to reduce the external size of the case 301 of the power converter 170.

[Layout of the Connecting Parts]

Figure 12:
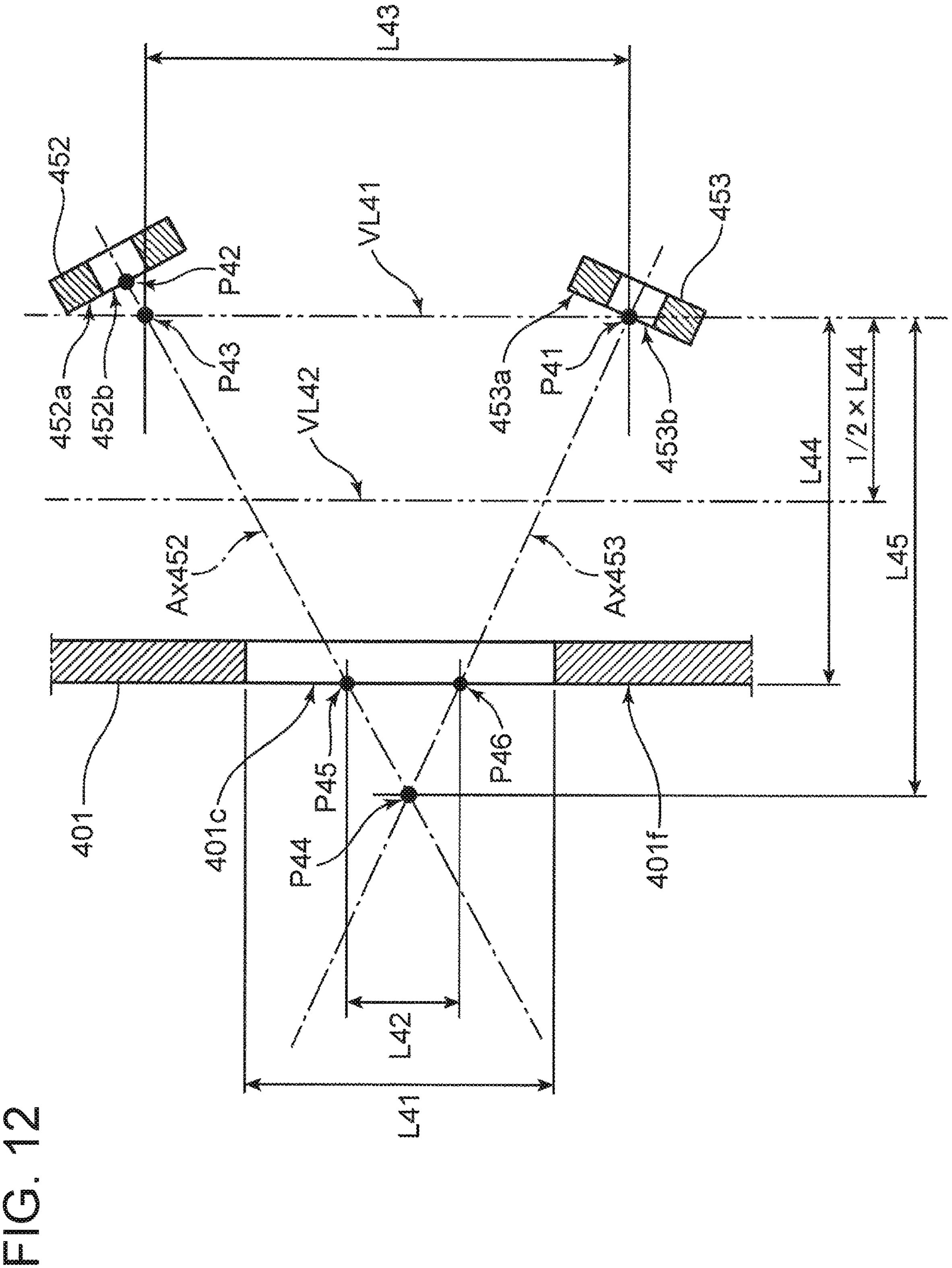
FIG. 12 is a schematic diagram illustrating a layout of a connecting part according to a first embodiment of the present disclosure.
Figure 13:
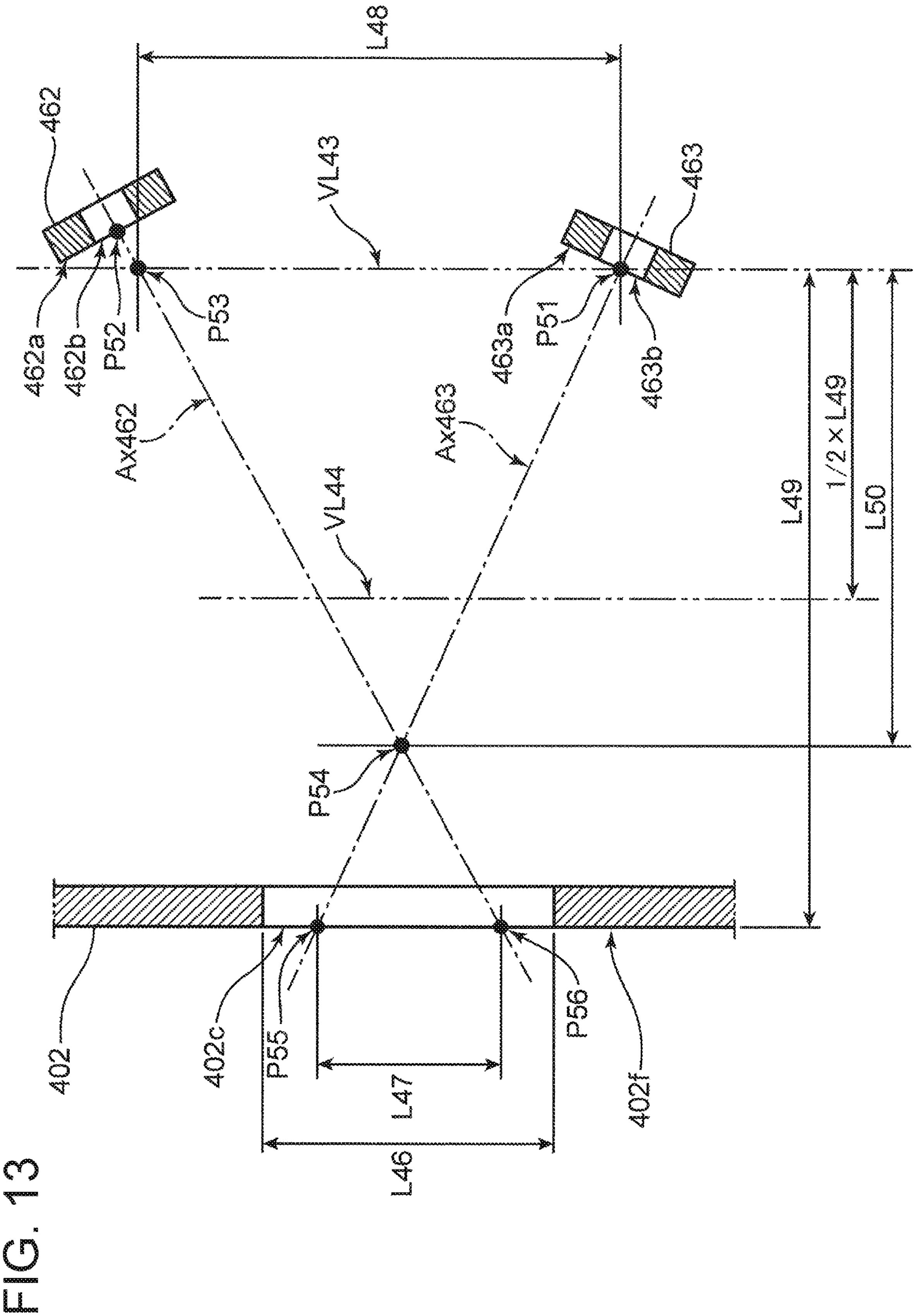
FIG. 13 is a schematic diagram illustrating a layout of a connecting part according to a second embodiment of the present disclosure.

The layout of the connecting parts is explained using FIGS. 12 and 13. In FIGS. 12 and 13, the AC busbars are shown as an example of a configuration including two busbars 452, 453, 462, 463, but it is also possible to have a configuration with three or more busbars as in the first and second embodiments above.

First Example

As shown in FIG. 12, in the first example, the AC connector part has two busbars 452, 453. The busbars 452,

453 have connecting parts 452*a*, 453*a* at their ends, respectively. The connecting parts 452*a*, 453*a* are for connecting to the connector part of the terminal block and have through-holes 452*b*, 453*b* that allow the insertion of bolts.

The busbars 452, 453 are housed in the case 401. The case 401 has an opening (tool insertion opening) 401*c* through which a bolt fastening tool is inserted when connecting the connector part of the terminal block to the respective connecting part 452*a*, 453*a* of the busbars 452, 453.

In this example, the paper surface of FIG. 12 is also defined as the reference plane. That is, assume there are a hypothetical line along the connecting surface of the connecting part 452*a* (facing toward the tool insertion opening 401*c*) and a hypothetical plane along the connecting surface of the connecting part 453*a* (facing toward the tool insertion opening 401*c*). The plane orthogonal to the intersection line where the two hypothetical lines cross (the paper plane in FIG. 12) is the reference plane.

In this example, one connecting part 453*a* is positioned farther from the tool insertion opening 401*c* than the other connecting part 452*a*.

A normal line Ax452 passing through the radial center of the through-hole 452*b* and orthogonal to the connecting surface of the connecting part 452*a* is drawn, and a normal line Ax453 passing through the radial center of the through-hole 453*b* and orthogonal to the connecting surface of the connecting part 453*a* is drawn. In this case, the normal line Ax452 and the normal line Ax453 pass through the tool insertion opening 401*c* through the points (positions) P45 and P46 and intersect each other outside of the case 401 (intersection point P44). In this example, the above-mentioned points P45 and P46 are also points located on the opening surface along the outer surface 401*f* of the case 401 in the tool insertion opening 401*c*.

Furthermore, for the connecting part 453*a* on the side closer to the tool insertion opening 401*c*, assume there is a virtual plane VL41 parallel to the tool insertion opening 401*c*, passing through the intersection point P41 between the virtual plane along the connecting surface of the connecting part 453*a* and the normal line Ax453. Further, L44 is the shortest distance to the virtual plane VL41 from the outer surface 401*f* of the outer wall of the case 401 with the tool insertion opening 401*c*. Assume there is a virtual plane VL42 parallel to the tool insertion opening 401*c*, passing through a point at half the distance L44 (½×L44). The intersection of the virtual plane VL41 and the normal line Ax452 is the point P43, and the intersection of the virtual plane along the connecting surface of the connecting part 452*a* and the normal line Ax452 is the point P42.

In this example, the connecting part 452*a* is positioned farther from the tool insertion opening 401*c* than the connecting part 453*a*, and thus point P42 is located farther from point P43.

On the reference plane shown in FIG. 12, the triangle defined by point P44, point P43, and point P41 and the triangle defined by point P44, point P45, and point P46 have a similarity relationship. When the distance between points P41 and P43 in the direction along the tool insertion opening 401*c* is L43 and the distance between points P45 and P46 is L42, the relationship L43>L42 is satisfied in this example.

Therefore, by applying the layout of this example, the size L41 of the tool insertion opening 401*c* can be smaller than the size L93 of the tool insertion opening 951*c* where the normal lines Ax952, Ax953, Ax954 are parallel shown in FIG. 14. In other words, in this example, there is a relationship that the distance L45 between the point P44 and the virtual plane VL41 is longer than the distance (½×L44) between the virtual plane VL41 and the virtual plane VL42. That is, the connecting parts 452*a*, 453*a* are arranged such that there is a relationship that both normal lines Ax452 and Ax453 intersect on the opposite side of the side where the connecting parts 452*a* and 453*a* are placed, with respect to the virtual plane VL42 passing through the position that is half (½×L44) of the distance L44 between the opening surface of the tool insertion opening 401*c* and the virtual plane VL41. With this arrangement, the size L41 of the tool insertion opening 401*c* can be kept smaller than in the comparative example shown in FIG. 14.

Second Example

As shown in FIG. 13, in the second example, the AC connector part has two busbars 462, 463. The busbars 462, 463 have connecting parts 462*a*, 463*a* at their ends, respectively. The connection parts 462*a*, 463*a* are for connecting to the connector part of the terminal block and have through-holes 462*b*, 463*b* that permit insertion of bolts.

The busbars 462, 463 are housed in the case 402. The case 402 has an opening (tool insertion opening) 402*c* through which a bolt fastening tool is inserted when connecting the connector part of the terminal block to the respective connecting parts 462*a*, 463*a* of the busbars 462, 463.

In this example, one connecting part 463*a* is positioned farther from the tool insertion opening 402*c* than the other connecting part 462*a*.

A normal line Ax462 passing through the radial center of the through-hole 462*b* and orthogonal to the connecting surface of the connecting part 462*a* is drawn, and a normal line Ax463 passing through the radial center of the through-hole 463*b* and orthogonal to the connecting surface of the connecting part 463*a* is drawn. In this case, the normal line Ax462 and the normal line Ax463 pass through the tool insertion opening 401*c* through the points P55 and P56. In this example, each of the above locations P55 and P56 is a point located on the opening surface along the outer surface 402*f* of the case 402 in the tool insertion opening 402*c*.

Furthermore, for the connecting part 463*a* on the side closer to the tool insertion aperture 402*c*, assume there is a virtual plane VL43 parallel to the tool insertion aperture 402*c*, passing through the intersection point P51 between the virtual plane along the connecting surface of the connecting part 463*a* and the normal line Ax463. Further, L49 is the shortest distance to the virtual plane VL43 from the outer surface 402*f* of the outer wall of the case 402 with the tool insertion opening 402*c*. Assume there is a virtual plane VL44 parallel to the tool insertion opening 402*c*, passing through a point at half the distance L49 (½×L49). The intersection of the virtual plane VL43 and the normal line Ax462 is the point P53, and the intersection of the virtual plane along the connecting surface of the connecting part 462*a* and the normal line Ax462 is the point P52.

In this example, point P52 is located farther from the tool insertion opening 402*c* than point P53 because the connecting part 462*a* is located farther than the connecting part 463*a*.

On the reference plane shown in FIG. 13, the triangle defined by point P54, point P53, and point P51 and the triangle defined by point P54, point P56, and point P55 have a similarity relationship. When the distance between points P51 and P53 in the direction along the tool insertion opening 402*c* is L48 and the distance between points P55 and P56 is L47, the relationship L48>L47 is satisfied in this example.

Therefore, by applying the layout of this example, the size L46 of the tool insertion opening 402*c* can be smaller than the size L93 of the tool insertion opening 951*c* where the normal lines Ax952, Ax953, Ax954 are parallel shown in FIG. 14. In other words, in this example, there is a relationship that the distance L50 between the point P54 and the virtual plane VL43 is longer than the distance (½×L49) between the virtual plane VL43 and the virtual plane VL44. That is, the connecting parts 462*a*, 463*a* are arranged such that there is a relationship that both normal lines Ax462 and Ax463 intersect on the opposite side of the side where the connecting parts 462*a* and 463*a* are placed, with respect to the virtual plane VL44 passing through the position that is half (½×L49) of the distance L49 between the opening surface of the tool insertion opening 402*c* and the virtual plane VL43. With this arrangement, the size L46 of the tool insertion opening 402*c* can be kept smaller than in the comparative example shown in FIG. 14.

[Other Modifications]

Although in the first to third embodiments the power converters 100, 160, and 170 are adopted as examples of the electric apparatus, the present disclosure is not limited to these embodiments. For example, the terminal structure according to the present disclosure may be applied to a switchboard, a DC-DC converter, an AC transformer, and a motor.

Further, when adopting the power converter as the electric apparatus, the terminal structure of the present disclosure may be applied to not only the vehicle-mounted power converter but also power converters used for industrial machinery.

Although in the first to third embodiments as well as the above first and second examples, the busbars 152-154, 252-254, 352, 353, 452, 453, 462, and 463 are adopted as examples of the wiring, the present disclosure is not limited to these types of wiring. For example, the wiring may be a wire harness. In this case, the terminal structure according to the present disclosure may be applied by joining terminals having a flat-type connecting surface as the connecting parts to the wire harness.

Although, in the first to third embodiments, no insulators are inserted among the connecting parts 152*a*, 153*a*, 154*a*, 252*a*, 253*a*, 254*a*, 352*a*, and 353*a*, and the gaps G1-G5 are more than the insulation distance, the present invention is not limited to this. For example, it is possible to insert an insulator such as ribs between adjacent connecting parts and to make the distance between the gaps connected by straight lines between the connecting parts less than the insulation distance.

Although in the first to third embodiments the tool insertion openings 101*c*, 201*c*, and 301*c* are formed in the case bodies 101*a*, 201*a*, and 301*a* of the case 101, 201, and 301, the tool insertion opening may be formed in the case lid.

Further, the tool insertion opening may be an opening which is formed by depressing an end edge of the case body or the case lid, other than the window-like hole.

Although in the first to third embodiments two or three connecting parts 152*a*, 153*a*, and 154*a*, 252*a*, 253*a*, and 254*a*, and 352*a* and 353*a* are provided inside the cases 101, 201, and 301, four or more connecting parts may be accommodated in the case.

Although in the first and second embodiments the three connecting parts 152*a*, 153*a*, and 154*a*, and 252*a*, 253*a*, and 254*a* are lined up in the up-and-down direction of the vehicle V, the present disclosure is not limited to these embodiments. For example, the connecting parts of the multiple terminals may be distributed in the left and right directions. Further, the connecting parts of three or more terminals may be distributed in two directions (up and down and left and right), two directions (front and back and right and left), or even in three directions (up and down, front and back, and left and right). In this case, the plurality of connecting parts are two-dimensionally or three dimensionally disposed within the case.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

100, 160, 170 Power Converter (Electric Apparatus)
101, 201, 301, 401, 402 Case
101*c*, 201*c*, 301*c*, 401*c*, 402*c* Tool Insertion Opening
150, 250, 350 AC Connector Part
151, 251, 351 AC Busbar
152, 252 U-phase Busbar (Terminal)
152*a*, 252*a* Connecting Part
153, 253 V-phase Busbar (Terminal)
153*a*, 253*a* Connecting Part
154, 254 W-phase Busbar (Terminal)
154*a*, 254*a* Connecting Part
155, 255, 355 Lid
352, 353, 452, 453, 462, 463 Busbar (Terminal)
352*a*, 353*a*, 552*a*, 453*a*, 462*a*, 463*a* Connecting Part

What is claimed is:

1. A terminal structure of an electric apparatus, comprising:

a plurality of terminals at least including a first terminal and a second terminal adjacent to the first terminal, each of the terminals having a connecting part that is electrically connected to an external apparatus and is arranged to extend from a predetermined reference plane to a direction orthogonal to the reference plane; and a case accommodating the plurality of terminals, and having a tool insertion opening into which a tool for electric connection of the plurality of terminals is to be inserted in a part of an outer wall, wherein the connecting part of each of the plurality of terminals has a flat connecting surface and a through-hole into which a bolt for the electrical connection is inserted, and wherein, when a first normal line passing through a radial center of the through-hole in the connecting part of the first terminal and extending in a direction normal to the connecting surface in the connecting part of the first terminal, and a second normal line passing through a radial center of the through-hole in the connecting part of the second terminal and extending in a direction normal to the connecting surface in the connecting part of the second terminal are drawn, the connecting part of the first terminal and the connecting part of the second terminal are arranged such that a distance between a point where the first normal line passes through the tool insertion opening and a point where the second normal line passes through the tool insertion opening is shorter than a distance between an intersection of the connecting surface and the first normal line in the connecting part of the first terminal and an intersection of the connecting surface and the second normal line in the connecting part of the second terminal, when viewed from the direction orthogonal to the reference plane.

2. The terminal structure of claim 1, wherein a first virtual plane is formed along the connecting surface of the connecting part of the first terminal and a second virtual plane is formed along the connecting surface of the connecting part of the second terminal, wherein a shortest distance from an intersection of the first virtual plane and the first normal line to a part of the outer wall is a first distance, and a shortest distance from an intersection of the second virtual plane and the second normal line to the part of the outer wall is a second distance, wherein the reference plane is defined in a direction orthogonal to an intersection of the first virtual plane and the second virtual plane where the first virtual plane and the second virtual plane intersect, and wherein the connecting part of the first terminal and the connecting part of the second terminal are disposed so that the first virtual plane and the second virtual plane intersect with each other at an obtuse angle, and when viewed from the direction orthogonal to the reference plane, the first normal line and the second normal line pass through the tool insertion opening, and the first normal line and the second normal line intersect with each other at an opposite side of the disposed positions of the connecting parts of the first terminal and the second terminal with respect to a position that is half of a distance of the shorter one of the first distance and the second distance.

3. The terminal structure of claim 2, wherein the connecting part of the first terminal and the connecting part of the second terminal are disposed so that the first normal line and the second normal line intersect with each other outside the case, when viewed from the direction orthogonal to the reference plane.

4. The terminal structure of claim 2, wherein the plurality of terminals are disposed so that gaps between adjacent connecting parts are more than an insulation distance.

5. The terminal structure of claim 2, wherein, in a direction orthogonal to a direction in which the first distance and the second distance above are defined in the reference plane, the tool insertion opening is formed so that an opening length of the tool insertion opening is shorter than a layout length of the connecting parts of the plurality of terminals.

6. The terminal structure of claim 2, wherein the electric apparatus is a power converter configured to convert direct current (DC) power into alternating current (AC) power, wherein the external apparatus is a three-phase AC motor configured to rotate in response to supply of three-phase AC power, wherein the plurality of terminals are disposed in an electric power supply passage to the three-phase AC motor, and are comprised of the first terminal, the second terminal, and a third terminal of which a connecting part is disposed adjacent to the connecting part of the second terminal, wherein a third virtual plane is formed along a connecting surface of the connecting part of the third terminal and a third normal line is formed passing through a radial center of the through-hole in the connecting part of the third terminal and extending in a direction normal to the connecting surface in the connecting part of the third terminal, and wherein, when a shortest distance from a point where the third virtual plane and the third normal line intersect to the part of the outer wall is a third distance, the connecting part of the third terminal is disposed so that the second virtual plane and the third virtual plane intersect with each other at an obtuse angle, and when viewed from the direction orthogonal to the reference plane, the second normal line and the third normal line pass through the tool insertion opening, and the second normal line and the third normal line intersect with each other at an opposite side of the disposed positions of the connecting parts of the second terminal and the third terminal with respect to a position that is half of a distance of the shorter one of the second distance and the third distance.

7. The terminal structure of claim 6, wherein the connecting part of the second terminal and the connecting part of the third terminal are disposed so that the second normal line and the third normal line intersect with each other outside the case, when viewed from the direction orthogonal to the reference plane.

8. The terminal structure of claim 1, wherein, when viewed from the direction orthogonal to the reference plane, a direction connecting a point where the first normal line passes through the tool insertion opening and a point where the second normal line passes through the tool insertion opening is a first direction, and a direction orthogonal to the first direction on the reference plane is a second direction, and wherein, when a first imaginary line passing through a radial center of the through-hole in the connecting part of the first terminal and extending in the second direction, and a second imaginary line passing through a radial center of the through-hole in the connecting part of the second terminal and extending in the second direction are drawn, the point where the first normal line passes through the tool insertion opening and the point where the second normal line passes through the tool insertion opening are positioned in an area between the first imaginary line and the second imaginary line in the first direction.

9. The terminal structure of claim 6, wherein the motor is a motor for propelling a vehicle, the motor mounted in a powertrain room of the vehicle and having a motor housing serving as an outer cell, wherein a transmission having an axle housing serving as an outer cell is mounted adjacent to the motor in the powertrain room, wherein the case is disposed on at least one of the motor housing and the axle housing so that the tool insertion opening is oriented to an input side of an impact load expected in the vehicle, and wherein an end of the case on the input side is flush in the surface with the motor housing or the axle housing, or is located on an opposite side from the input side.

10. The terminal structure of claim 3, wherein the electric apparatus is a power converter configured to convert direct current (DC) power into alternating current (AC) power, wherein the external apparatus is a three-phase AC motor configured to rotate in response to supply of three-phase AC power, wherein the plurality of terminals are disposed in an electric power supply passage to the three-phase AC motor, and are comprised of the first terminal, the second terminal, and a third terminal of which a connecting part is disposed adjacent to the connecting part of the second terminal, wherein a third virtual plane is formed along a connecting surface of the connecting part of the third terminal and a third normal line is formed passing through a radial center of the through-hole in the connecting part of the third terminal and extending in a direction normal to the connecting surface in the connecting part of the third terminal, and wherein, when a shortest distance from a point where the third virtual plane and the third normal line intersect to the part of the outer wall is a third distance, the connecting part of the third terminal is disposed so that the second virtual plane and the third virtual plane intersect with each other at an obtuse angle, and when viewed from the direction orthogonal to the reference plane, the second normal line and the third normal line pass through the tool insertion opening, and the second normal line and the third normal line intersect with each other at an opposite side of the disposed positions of the connecting parts of the second terminal and the third terminal with respect to a position that is half of a distance of the shorter one of the second distance and the third distance.

11. The terminal structure of claim 10, wherein the connecting part of the second terminal and the connecting part of the third terminal are disposed so that the second normal line and the third normal line intersect with each other outside the case, when viewed from the direction orthogonal to the reference plane.

12. The terminal structure of claim 10, wherein the motor is a motor for propelling a vehicle, the motor mounted in a powertrain room of the vehicle and having a motor housing serving as an outer cell, wherein a transmission having an axle housing serving as an outer cell is mounted adjacent to the motor in the powertrain room, wherein the case is disposed on at least one of the motor housing and the axle housing so that the tool insertion opening is oriented to an input side of an impact load expected in the vehicle, and wherein an end of the case on the input side is flush in the surface with the motor housing or the axle housing, or is located on an opposite side from the input side.

13. The terminal structure of claim 4, wherein the electric apparatus is a power converter configured to convert direct current (DC) power into alternating current (AC) power, wherein the external apparatus is a three-phase AC motor configured to rotate in response to supply of three-phase AC power, wherein the plurality of terminals are disposed in an electric power supply passage to the three-phase AC motor, and are comprised of the first terminal, the second terminal, and a third terminal of which a connecting part is disposed adjacent to the connecting part of the second terminal, wherein a third virtual plane is formed along a connecting surface of the connecting part of the third terminal and a third normal line is formed passing through a radial center of the through-hole in the connecting part of the third terminal and extending in a direction normal to the connecting surface in the connecting part of the third terminal, and wherein, when a shortest distance from a point where the third virtual plane and the third normal line intersect to the part of the outer wall is a third distance, the connecting part of the third terminal is disposed so that the second virtual plane and the third virtual plane intersect with each other at an obtuse angle, and when viewed from the direction orthogonal to the reference plane, the second normal line and the third normal line pass through the tool insertion opening, and the second normal line and the third normal line intersect with each other at an opposite side of the disposed positions of the connecting parts of the second terminal and the third terminal with respect to a position that is half of a distance of the shorter one of the second distance and the third distance.

14. The terminal structure of claim 13, wherein the connecting part of the second terminal and the connecting part of the third terminal are disposed so that the second normal line and the third normal line intersect with each other outside the case, when viewed from the direction orthogonal to the reference plane.

15. The terminal structure of claim 13, wherein the motor is a motor for propelling a vehicle, the motor mounted in a powertrain room of the vehicle and having a motor housing serving as an outer cell, wherein a transmission having an axle housing serving as an outer cell is mounted adjacent to the motor in the powertrain room, wherein the case is disposed on at least one of the motor housing and the axle housing so that the tool insertion opening is oriented to an input side of an impact load expected in the vehicle, and wherein an end of the case on the input side is flush in the surface with the motor housing or the axle housing, or is located on an opposite side from the input side.

16. The terminal structure of claim 5, wherein the electric apparatus is a power converter configured to convert direct current (DC) power into alternating current (AC) power, wherein the external apparatus is a three-phase AC motor configured to rotate in response to supply of three-phase AC power, wherein the plurality of terminals are disposed in an electric power supply passage to the three-phase AC motor, and are comprised of the first terminal, the second terminal, and a third terminal of which a connecting part is disposed adjacent to the connecting part of the second terminal, wherein a third virtual plane is formed along a connecting surface of the connecting part of the third terminal and a third normal line is formed passing through a radial center of the through-hole in the connecting part of the third terminal and extending in a direction normal to the connecting surface in the connecting part of the third terminal, and wherein, when a shortest distance from a point where the third virtual plane and the third normal line intersect to the part of the outer wall is a third distance, the connecting part of the third terminal is disposed so that the second virtual plane and the third virtual plane intersect with each other at an obtuse angle, and when viewed from the direction orthogonal to the reference plane, the second normal line and the third normal line pass through the tool insertion opening, and the second normal line and the third normal line intersect with each other at an opposite side of the disposed positions of the connecting parts of the second terminal and the third terminal with respect to a position that is half of a distance of the shorter one of the second distance and the third distance.

17. The terminal structure of claim 16, wherein the connecting part of the second terminal and the connecting part of the third terminal are disposed so that the second normal line and the third normal line intersect with each other outside the case, when viewed from the direction orthogonal to the reference plane.

18. The terminal structure of claim 16, wherein the motor is a motor for propelling a vehicle, the motor mounted in a powertrain room of the vehicle and having a motor housing serving as an outer cell, wherein a transmission having an axle housing serving as an outer cell is mounted adjacent to the motor in the powertrain room, wherein the case is disposed on at least one of the motor housing and the axle housing so that the tool insertion opening is oriented to an input side of an impact load expected in the vehicle, and wherein an end of the case on the input side is flush in the surface with the motor housing or the axle housing, or is located on an opposite side from the input side.

* * * * *